United States Patent
Johnson et al.

(10) Patent No.: US 10,477,543 B2
(45) Date of Patent: Nov. 12, 2019

(54) METHODS AND SYSTEMS FOR IMPROVED COMMUNICATION IN MULTI-HOP NETWORKS

(71) Applicant: TrellisWare Technologies, Inc., San Diego, CA (US)

(72) Inventors: Mark Johnson, Poway, CA (US); Peter Ly, Escondido, CA (US)

(73) Assignee: TRELLISWARE TECHNOLOGIES, INC., San Diego, CA (US)

( * ) Notice: Subject to any disclaimer, the term of this patent is extended or adjusted under 35 U.S.C. 154(b) by 98 days.

(21) Appl. No.: 15/717,475

(22) Filed: Sep. 27, 2017

(65) Prior Publication Data

US 2019/0098625 A1     Mar. 28, 2019

(51) Int. Cl.
| | |
|---|---|
| H04W 72/04 | (2009.01) |
| H04W 40/04 | (2009.01) |
| H04B 7/06 | (2006.01) |
| H04L 5/00 | (2006.01) |
| H04W 56/00 | (2009.01) |
| H04W 84/18 | (2009.01) |
| H04W 52/00 | (2009.01) |

(52) U.S. Cl.
CPC ...... *H04W 72/0446* (2013.01); *H04B 7/0697* (2013.01); *H04W 40/04* (2013.01); *H04L 5/0007* (2013.01); *H04W 52/00* (2013.01); *H04W 56/0045* (2013.01); *H04W 72/0453* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 8,014,378 B1* | 9/2011 | Yoon | H04L 67/1095 370/324 |
| 2004/0143842 A1 | 7/2004 | Joshi | |
| 2005/0180356 A1 | 8/2005 | Gillies et al. | |
| 2007/0111775 A1* | 5/2007 | Yoseloff | G07F 17/32 463/16 |
| 2007/0211686 A1 | 9/2007 | Belcea et al. | |
| 2007/0258466 A1 | 11/2007 | Kakani | |

(Continued)

OTHER PUBLICATIONS

Combined Search Report and Written Opinion in International Application No. PCT/US17/51111, dated Nov. 27, 2017.

(Continued)

*Primary Examiner* — Kodzovi Acolatse
(74) *Attorney, Agent, or Firm* — Perkins Coie LLP

(57) ABSTRACT

Methods and systems for improving communication in a multi-hop, time-slotted wireless network are presented. Embodiments of the present invention are able re-use timeslots to locally transmit information to one-hop nodes, thereby utilizing the bandwidth more efficiently. Other embodiments are able to evaluate the trade-off between power consumption and communication reliability, and are consequently able to provide increasing degrees of robustness for broadcasts in the wireless network. That is, these latter embodiments are able to incrementally use re-transmissions, therein trading-off battery life for an increased message completion rate or a lower packet error rate, for example, in order to reliably broadcast critical or high-priority message network-wide.

18 Claims, 20 Drawing Sheets

(56) References Cited

U.S. PATENT DOCUMENTS

| | | |
|---|---|---|
| 2008/0107044 A1 | 5/2008 | Blair et al. |
| 2008/0220790 A1 | 9/2008 | Cai et al. |
| 2009/0073921 A1 | 3/2009 | Ji et al. |
| 2009/0134969 A1 | 5/2009 | Veillette |
| 2010/0238855 A1* | 9/2010 | Yoshida .................. H04B 7/155 370/315 |
| 2011/0013644 A1 | 1/2011 | Das et al. |
| 2013/0301471 A1* | 11/2013 | Brown ................ H04W 40/248 370/254 |
| 2013/0301633 A1* | 11/2013 | Brown .................. H04J 3/0647 370/350 |
| 2013/0315131 A1* | 11/2013 | Brown .................... H04L 45/32 370/315 |
| 2015/0023213 A1 | 1/2015 | Soneda et al. |
| 2016/0081024 A1 | 3/2016 | Gokturk et al. |
| 2016/0191181 A1 | 6/2016 | Bailey |
| 2017/0317906 A1 | 11/2017 | Tsai et al. |
| 2018/0102876 A1 | 4/2018 | Johnson |

OTHER PUBLICATIONS

Combined Search Report and Written Opinion dated Dec. 18, 2018 for International Application No. PCT/US18/52956; 11 pages.

* cited by examiner

METHODS AND SYSTEMS FOR IMPROVED COMMUNICATION IN MULTI-HOP NETWORKS

FIELD OF THE INVENTION

The present invention relates to the field of multi-hop wireless networks, and in particular, to the field of time-slotted multi-hop networking protocols.

BACKGROUND

Multi-hop networking protocols enable nodes in a wireless infrastructure-less network to maintain connections to the network, as well as supporting efficient addition and removal of nodes to and from the wireless network. Due to the mobility of the nodes, the network topology may evolve unpredictably over time. Networking protocols for efficient communication in mobile ad hoc networks (MANET) typically need to address a variety of challenges that include dynamic topologies, security and reliability, challenging and rapidly evolving wireless channels, quality-of-service (QoS) requirements, multicast and broadcast capabilities, and support for inter-networking.

In an example, dynamic interference or fading environments may make broadcasting an unreliable operation in a wireless network, particularly with low-power nodes or constrained power consumption requirements. Unreliable communications at the broadcast-level can result in broadcast coverage that is not network-wide. These scenarios may cause reduced throughputs or stagnant/stale nodes, both of which are extremely undesirable for critical network messages and operations. Furthermore, bandwidth constraints further impede on broadcasting capabilities, especially in the context of new nodes joining the network and updating position location information (PLI). Both these applications typically require frequent messaging (albeit at low data rates), but ideally should not impact scheduled data transmissions.

Modern commercial and military applications require robustness and bandwidth efficiency with respect to information (both control and data) dissemination throughout a wireless network, and thus, there is a need for improved communications and networking protocols in wireless networks. Embodiments of the present invention provide mechanisms for the local re-use of bandwidth and reliable broadcasting using re-transmissions.

SUMMARY

Thus, it is an object of the present invention to provide methods and systems for improving communication in multi-hop networks. For example, in one embodiment comprising a wireless network with a source node, a plurality of relay nodes, and a plurality of out-of-network nodes, in which each of the plurality of out-of-network nodes is one hop away from the source node and the wireless network is configured to use a spatial pipelining factor (SPF), a method for local re-use comprises transmitting, in an $N^{th}$ timeslot, a first data signal over a first frequency allocation, wherein the first data signal is received by a first subset of nodes, and wherein each of the first subset of nodes is one of the plurality of relay nodes and is one hop away from the source node, then transmitting, in an $M^{th}$ timeslot, a local information signal over a second frequency allocation, wherein M is greater than N, wherein M is less than (N+SPF), wherein the local information signal is received by a second subset of nodes, and wherein the second subset of nodes comprises the first subset of nodes and the plurality of out-of-network nodes, and finally transmitting, in an $(N+SPF)^{th}$ timeslot, a second data signal over a third frequency allocation, wherein the second data signal is received by at least one of the first subset of nodes, and wherein if one of the plurality of relay nodes is retransmitting the first data signal, the one of the plurality of relay nodes is retransmitting over the third frequency allocation.

In another embodiment comprising a wireless network with a source node and a plurality of relay nodes, in which at least one of the plurality of relay nodes is N hops from the source node, a method for reliable broadcasting using re-transmissions over a plurality of timeslots comprises broadcasting the transmission in a first timeslot with a time-to-live (TTL) field set to M and a hop count field set to 1, wherein M is greater than or equal to N, evaluating a trade-off between power consumption and communication reliability, and re-broadcasting the transmission in a second timeslot subsequent to the first timeslot based on the evaluation, wherein the hop count field is incremented prior to the source node re-broadcasting the transmission, wherein each of the plurality of relay nodes is configured to receive the transmission in at least one of the plurality of timeslots, and re-broadcast the transmission in a relay timeslot that is subsequent to the at least one of the plurality of timeslots as long as the hop count field is less than or equal to the TTL field, and wherein the hop count field of the received transmission is incremented prior to each of the plurality of relay nodes re-broadcasting the transmission.

These illustrative embodiments are mentioned not to limit or define the limits of the present subject matter, but to provide examples to aid in the understanding thereof Illustrative embodiments are discussed in the Detailed Description, and further examples are provided there. Advantages offered by various embodiments may be further understood by examining this specification and/or by practicing one or more embodiments of the claimed subject matter.

BRIEF DESCRIPTION OF THE DRAWINGS

FIGS. 1A, 1B and 1C show illustrative slot assignments for multi-hop networks, according to an embodiment of the present invention;

Figure 2:
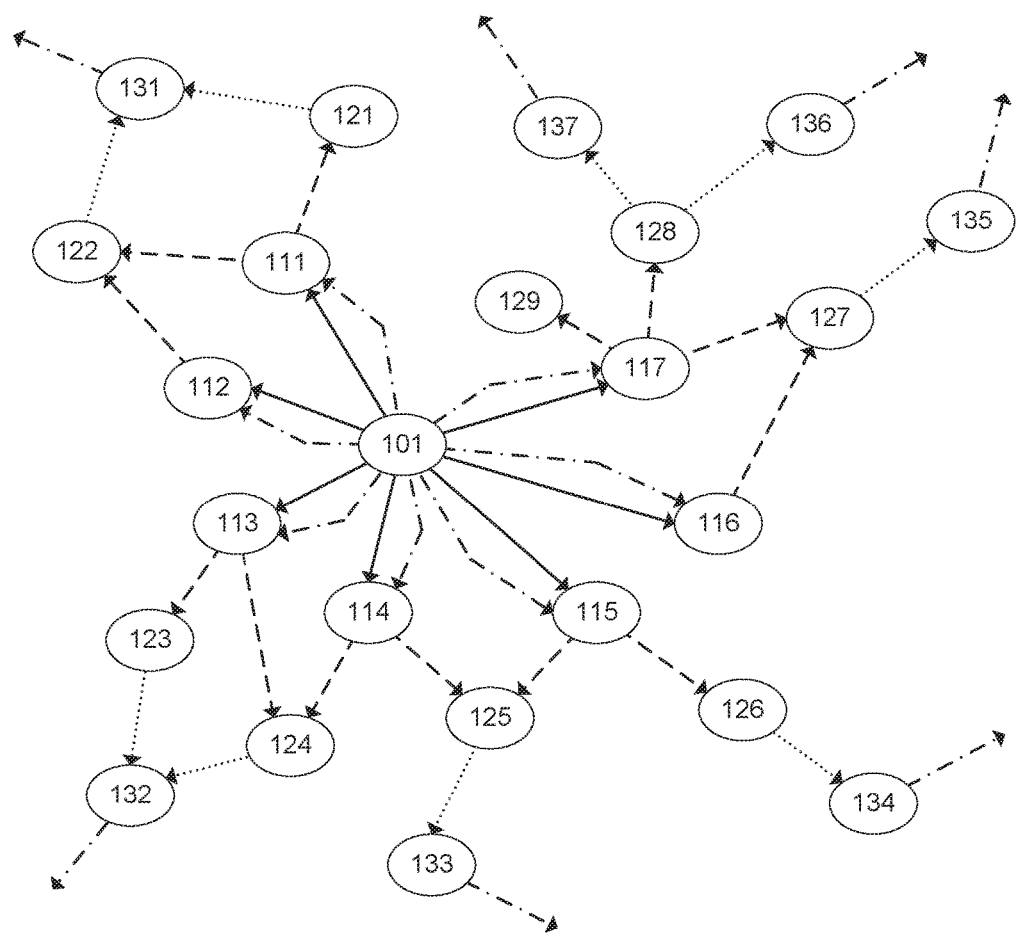
FIG. 2 shows an illustrative broadcast flooding protocol for barrage relay networks, according to an embodiment of the present invention.

Like labels are used to refer to the same or similar modules and/or events on a timeline in the drawings.

DETAILED DESCRIPTION

In the Summary above and in this Detailed Description, in the claims below, and in the accompanying drawings, reference is made to particular features (including method steps and timelines) of the invention. It is to be understood that the disclosure of the invention in this specification does not include all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between any of the defined steps, or after all the defined steps (except where the context excludes that possibility).

When reference is made herein to a timeline comprising two or more defined events, the defined events can be carried out in any order or simultaneously (except where the context excludes that possibility), and the timeline can include one or more other events which are carried out before any of the defined events, between any of the defined events, or after all the defined events (except where the context excludes that possibility).

The embodiments described herein are directed towards a multi-hop, time-slotted wireless network. That is, a wireless network that may implement a time-division multiple access (TDMA) scheme that divides a unit of time (for example, one second, which may be referred to as a frame) into slots, each of which are dedicated for the transmissions and reception of messages from nodes that may be multiple hops from each other. Without loss of generality, timeslots for transmission may be consecutive or assigned at specific times within the frame, wherein the latter approach is typically referred to as a "virtual channel" or a "logical channel."

Figures 1A, 1B, 1C:
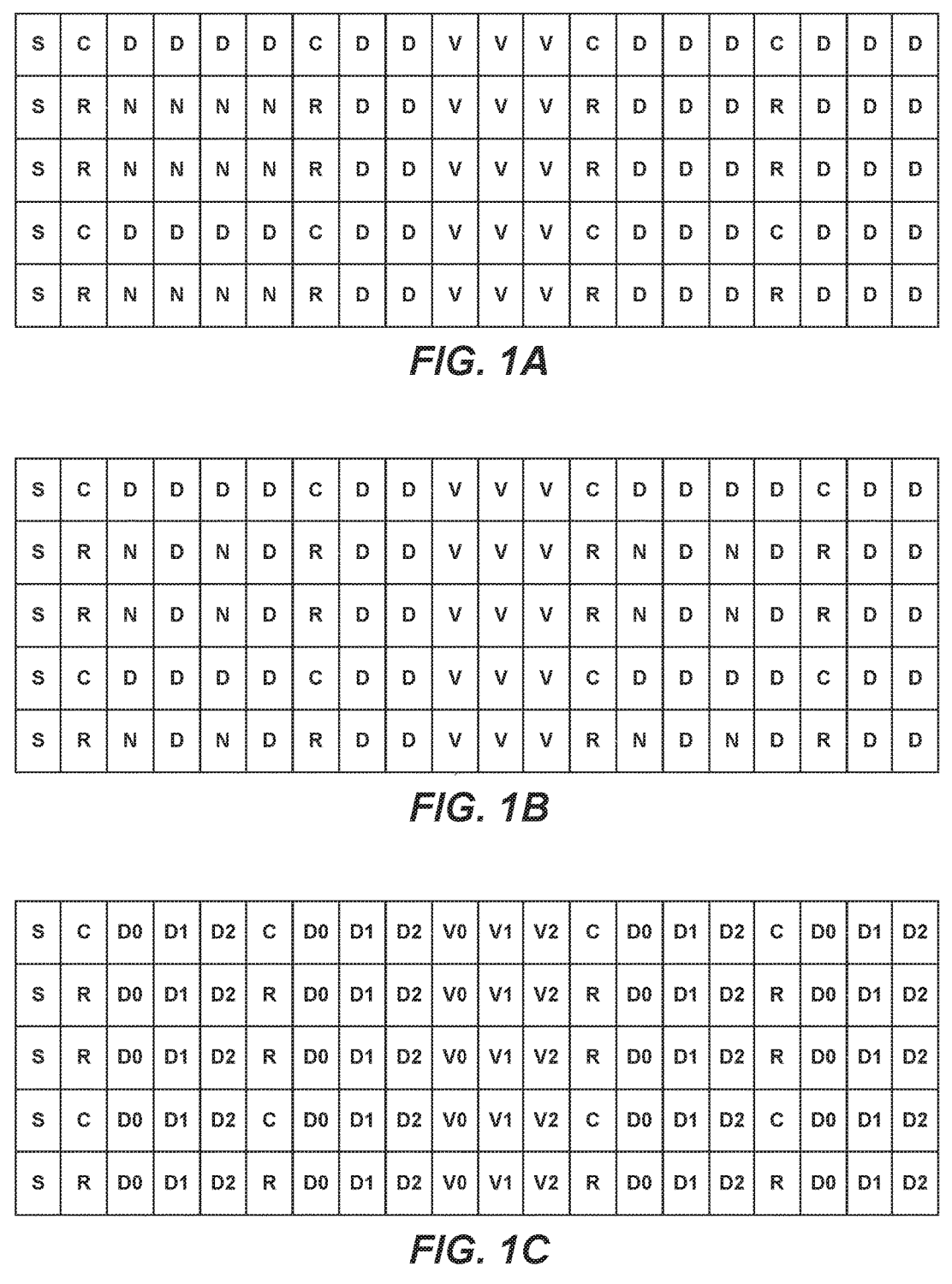

In an example, the representative slot assignments shown in FIGS. 1A, 1B and 1C define virtual channels for different types of messages including synchronization, data and voice messages. Table 1 provides a legend for some of the types of slots assigned within a frame.

TABLE 1

| Logical channels used in slot assignments | |
| --- | --- |
| S | Synchronization logical channel |
| C | Clear-to-send logical channel |
| R | Request-to-send logical channel |
| N | Network maintenance logical channel |
| D | Data logical channel |
| V | Voice logical channel |

Embodiments of the present invention, as described in the Detailed Description and shown in the Drawings, describe operations in the context of "subsequent timeslots." It is to be noted that subsequent timeslots may represent either the very next timeslot in time, or as in the context of FIGS. 1A, 1B and 1C, the very next timeslot that has been assigned to that particular type of message. That is, a subsequent timeslot may be the very next timeslot in the virtual (or logical) channel, and not necessarily subsequent in time and/or frequency.

A Barrage Relay Network (BRN), which is an example of a wireless network that supports embodiments of the present invention, is shown in FIG. 2. The BRN in FIG. 2 illustrates a wireless network where independent medium allocations are obtained via a time-division multiple access (TDMA) scheme. While BRNs can be defined according to various medium allocation schemes (e.g., time-slotting, different frequency channels, different frequency-hopping patterns, different antenna radiation patterns, low cross-correlation spreading sequences, and the like), embodiments of the present invention are described in the context of a time-slotted barrage relay network but are intended to be applicable to other medium allocation schemes.

In particular, time is divided into frames, which are further divided into multiple slots per frame (for example, FIG. 2 employs 3 slots per frame labeled "A," "B" and "C"). The data that is transmitted in a given time slot is denoted a "packet." Two packets that are transmitted by two different nodes are said to be identical if all data—including all protocol header information—contained in the respective packets is identical.

In an embodiment, for example, a central node 101 transmits a packet on slot A of the first TDMA frame. All nodes that successfully receive this packet are, by definition, one hop away from the source. These nodes are labeled 111-117 in FIG. 2. These nodes transmit the same packet on slot B, thus relaying to nodes that are two hops away from the source (nodes 121-129), which in turn transmit the same packet on slot C. Nodes that are three hops away from the source node (nodes 131-137) relay the packet on slot A of the second TDMA frame. Thus, packets transmit outward from the source via a decode-and-forward approach.

In the embodiment shown in FIG. 2, a number of two-hop nodes receive the same packet from different one-hop nodes. These packets do not collide due to the physical (PHY) layer processing employed by BRNs. In particular, BRNs employ a PHY layer that allows identical packets to be combined at the receiver in a manner analogous to multipath mitigation in traditional radio receivers. That is, the multiple, time-shifted copies of the received signal that arise in BRNs can be interpreted at the receiver as resulting not from different transmitting nodes, but from reflections off, for example, buildings when a single source transmits.

In order for two packets to be identical, both the payload data and all protocol header data must be identical. Therefore, protocol headers in a barrage relay network can be modified only in a manner that is common across all nodes at a given hop distance from the source. This is in stark contrast to traditional layered network architectures that employ a point-to-point link abstraction at Layer 2, wherein protocol headers can be modified in a node-specific—as opposed to a hop-specific—manner.

In some embodiments, the spatial reuse of time slots enables packets to be pipelined into the source for transmission every three slots. Specifically, as shown in FIG. 2, the one-hop nodes will not receive the packet broadcast by the three-hop nodes during slot A of the second TDMA frame. Thus, the source can safely transmit a second packet during that slot. In this manner, a throughput of W/3 can be achieved for broadcast in a single-source BRN (wherein W is the capacity of a single point-to-point link). This efficient injection of messages for broadcast transmission is denoted "spatial pipelining" in order to highlight its reuse of time slots between spatially separated nodes.

More generally, spatial pipelining can be achieved by having a source node inject a new packet for every barrage relay broadcast every M slots resulting in a throughput of W/M. In this context, M is referred to as the spatial pipelining factor (SPF). In some embodiments, when the size of an arbitrary wireless network is not known to the source a priori, M must be at least 3 to avoid collisions. Larger spatial pipelining factors (e.g. 4) may be chosen in order to enhance robustness in highly mobile network topologies.

Furthermore, in order to contain the extent of a given barrage relay transmission, two fields can be incorporated into the header (preamble) of each data packet: a time-to-live (TTL) field and a hop count (HC) field. The TTL field is unchanged by relaying nodes while the HC field is initially set to 1 by the source of the packet and incremented upon relay. In the context of FIG. 2, the central node 101 may set the TTL field to 8, and enable the packet to propagate over 8 hops through the BRN. The one-hop neighbors of this central node would receive such packets and relay a modified packet with the HC field set to 2. Similarly, two-hop neighbors set the HC to 3, and so on. Relaying continues whenever a received packet has an HC field that is less than or equal to the TTL field, but stops if this condition cannot be satisfied.

Although the description of the interaction between the TTL and HC fields is in the context of BRNs, the notion of increasing the HC field upon relaying and stopping the relaying process when a packet with equal TTL and HC fields is received is not limited to BRNs, and is in general compatible with other wireless networks. For example, a time-slotted multi-hop network that comprises a single node at each hop can support the interaction between the TTL and HC, as well as spatial pipelining, in the manner described above.

Figure 3A:
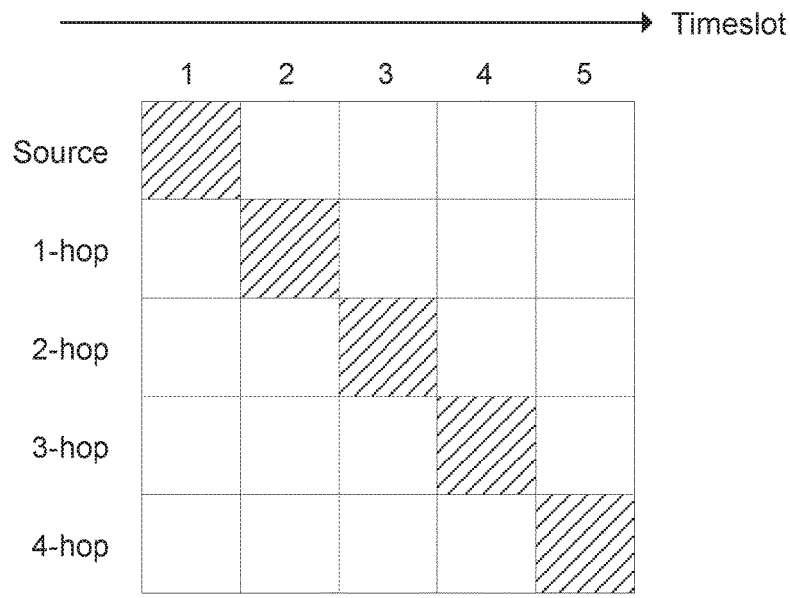
FIGS. 3A and 3B show assignments of timeslots in a multi-hop network for the basic broadcast mechanism.
Figure 3B:
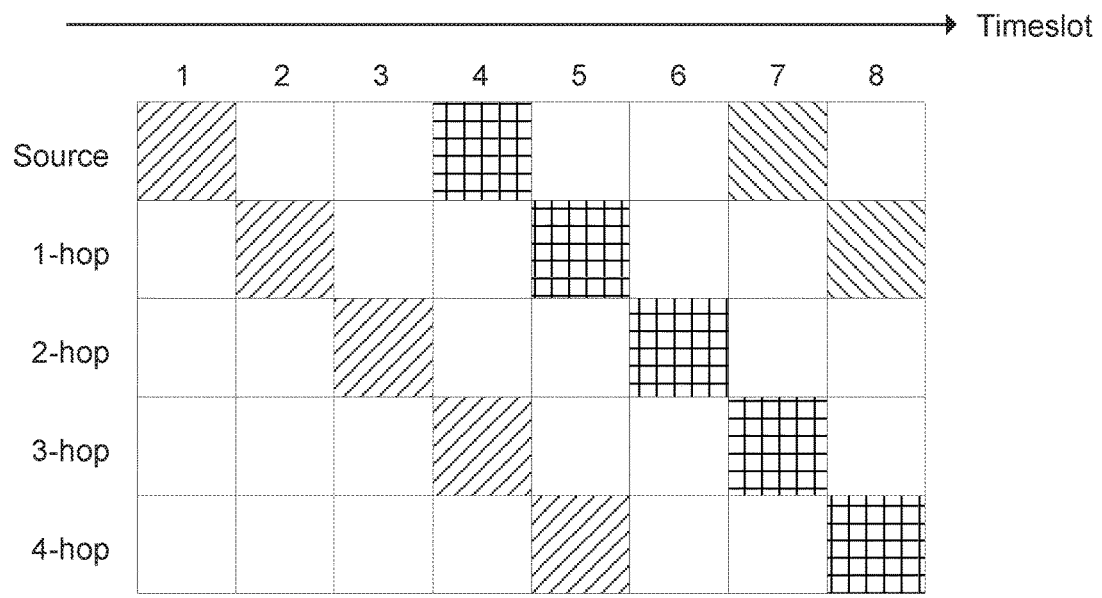

FIGS. 3A and 3B show an assignment of timeslots for a basic broadcast mechanism in a multi-hop wireless network, wherein a shaded square represents a transmission by the node specified on the y-axis in the timeslot specified by the x-axis, and a blank/white square represents a node receiving the transmission, or more generally, in a listening state. As shown in FIG. 3A, a source node broadcasts a transmission in a first timeslot, which is received by one or more nodes that are one-hop away from the source node in that same timeslot. Each of the one-hop neighbors of the source node relay (or re-broadcast) the transmission in a second timeslot subsequent to the first timeslot. As noted above, the subsequent timeslot may be in time, or in the context of a logical or virtual channel, based on slot assignments, as shown in FIGS. 1A, 1B and 1C.

The broadcast mechanism continues in consecutive timeslots, as shown in FIG. 3A, as each of a set of nodes that are an increasing number of hops away from the source node receive the transmission, and re-broadcast it in a subsequent timeslot to ensure its dissemination network-wide. For the basic broadcast mechanism, the TTL field may be set equal to the number of hops since nodes are expected to relay the transmission in a timeslot subsequent to that in which the transmission is received.

FIG. 3B shows the timeslot assignments for the basic broadcast mechanism in a barrage relay network, which employs a spatial pipelining factor of 3. As shown in FIG. 3B, a first transmission (shown with linear hatching) starts from the source node in timeslot 1, and is relayed through the network as shown in FIG. 3A. However, a second transmission (shown with cross-hatching) is started 3 slots later, in timeslot 4, and can propagate network-wide without colliding with the first transmission, as discussed in the context of FIG. 2. Similarly, a third transmission is started another 3 slots later, in timeslot 7, and may propagate through the wireless multi-hop network without colliding with the second transmission.

As discussed previously, embodiments of the present invention will be described in the context of a time-slotted network. That is, the use of non-overlapping time slots is the medium allocation scheme that is employed herein. In an embodiment, each of the transmissions (shaded boxes, regardless of the pattern) in FIG. 3B may be on the same frequency, but using a spatial pipelining factor of 3 ensures that there are no collisions. Similarly, a single frequency-hopping pattern may be used for all the transmissions. In another embodiment, each of the transmissions in FIG. 3B may use a different frequency-hopping pattern in order to support simultaneous transmissions by multiple sources (each with its own spatial pipeline).

As discussed above, a multi-hop network with a spatial pipelining factor of 3 results in a throughput of W/3, where W is the capacity of a single point-to-point link. This throughput must typically support broadcasting both user data as well as control messages. In an effort to maintain the W/3 throughput for user data, some messages may be broadcast based on the local re-use of spectrum. Table 2 provides examples of messages that are suited for local re-use.

TABLE 2

Message types for local re-use

| | | |
|---|---|---|
| NI | Network information | Allows nodes to join the network |
| NNI | Node/Neighborhood information | Share local information with one-hop network neighbors |
| RTT | Round Trip Timing (RTT) request/response | Maintain synchronization without a distributed time reference |

Figure 4A:
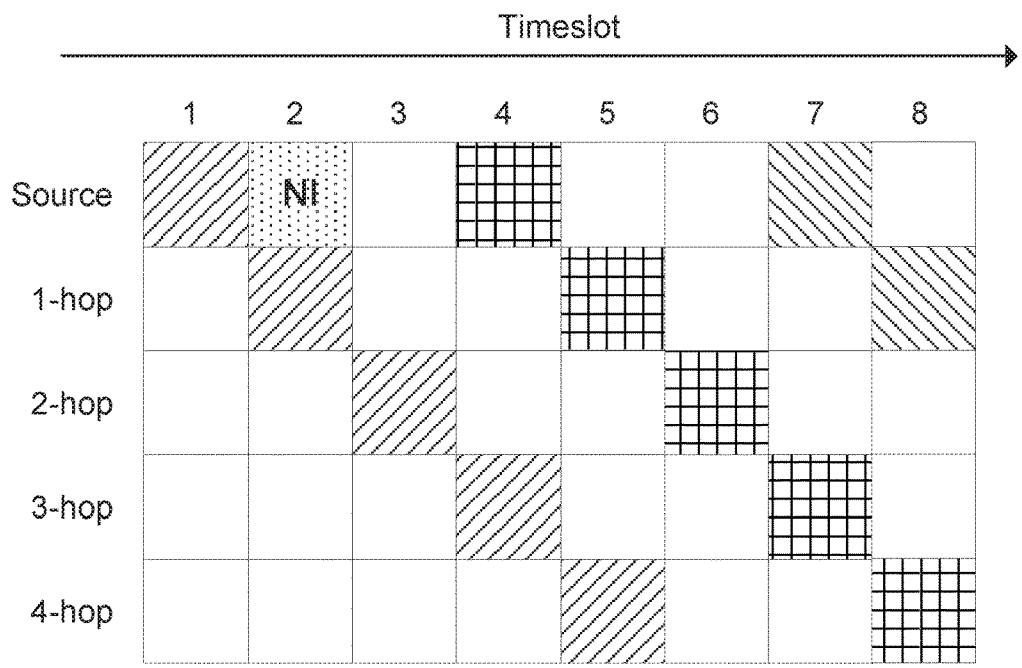
FIGS. 4A and 4B show assignments of timeslots in a multi-hop network for the local re-use protocol, according to an embodiment of the present invention.
Figure 4B:
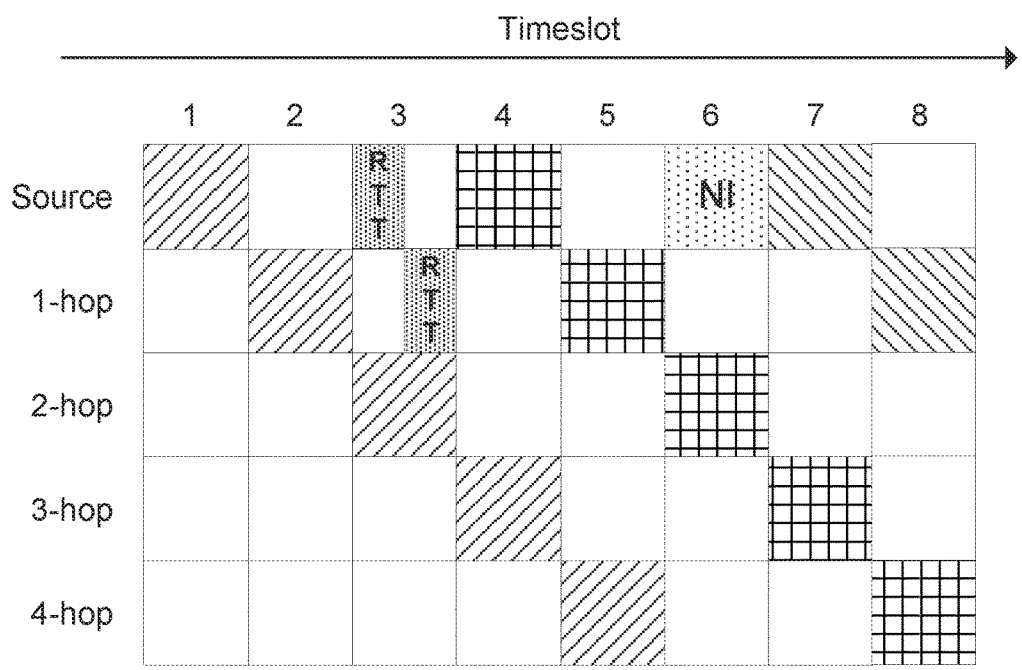

FIGS. 4A and 4B show assignments of timeslots in a multi-hop wireless network with a spatial pipelining factor of 3, when using the local re-use protocol, according to embodiments of the present invention. FIG. 4A repeats the timeslot assignments of FIG. 3B and includes the re-use of timeslots (and bandwidth) for the purposes of local communication.

In an embodiment, the source in FIG. 4A transmits network information (NI) in the second timeslot that enables out-of-network nodes to join the network. In order to ensure that the NI transmission from the source node does not interfere with the relayed transmission from the one-hop in-network nodes, NI may be transmitted on an orthogonal channel. That is, the channels used by the source and the one-hop network nodes, in the second timeslot, may be on different frequencies or use different frequency-hopping patterns.

In another embodiment, the source in FIG. 4B transmits a round trip timing (RTT) request, in a first portion of timeslot 3, to all in-network nodes that are one-hop away from the source node. In an example, the RTT request may ask nodes that have more accurate timing references to transmit their timing basis. Those one-hop nodes that satisfy this criterion transmit a RTT response in a second portion of timeslot 3. As in the case of FIG. 4A, the RTT request and RTT response are transmitted on a frequency or frequency-hopping pattern that is orthogonal to that used by the two-hop nodes to relay information in the data pipeline.

FIG. 4B additionally shows the source node transmitting NI in timeslot 6, which as discussed above, enables any one-hop out-of-network nodes to join the network. As in the previously considered embodiments, the transmission of the NI message by the source and the relaying of information by the two-hop nodes may be implemented on different frequencies or frequency-hopping patterns. In another embodiment, NI may be transmitted on a frequency or frequency-hopping pattern that is identical to that used by the 2-hop relay nodes in the same timeslot. Since NI is intended for out-of-network nodes that are one-hop away from the source, and the relayed transmission is intended for network nodes that are three hops away from the source, the two messages will not collide due to the spatial separation between them, and thus the same frequency or frequency-hopping pattern may be used for these transmissions.

Figure 5A:
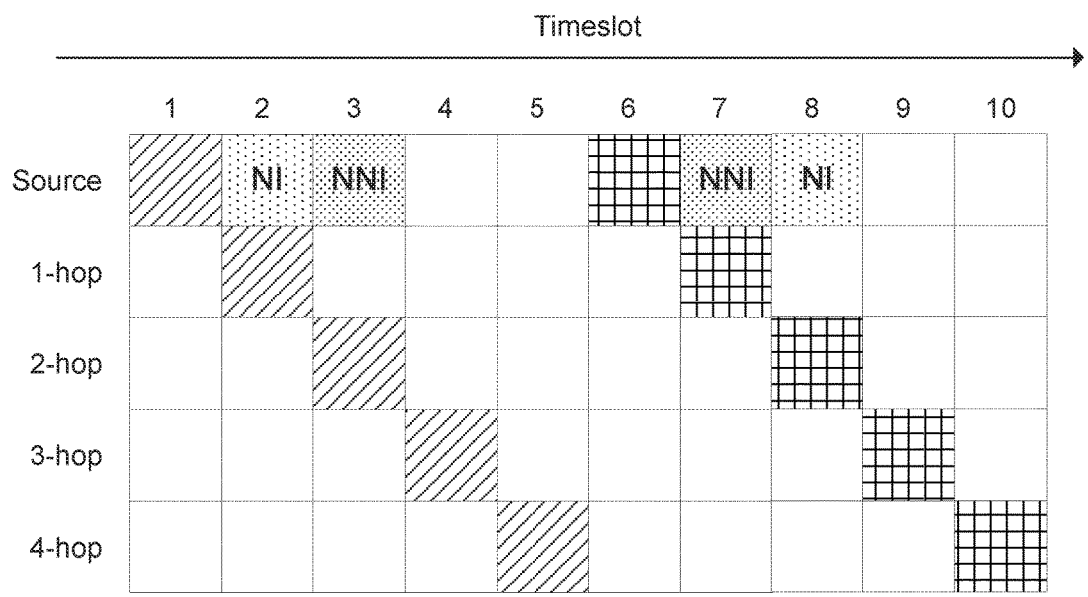
FIGS. 5A and 5B show assignments of timeslots in a multi-hop network for the local re-use protocol, according to another embodiment of the present invention.
Figure 5B:
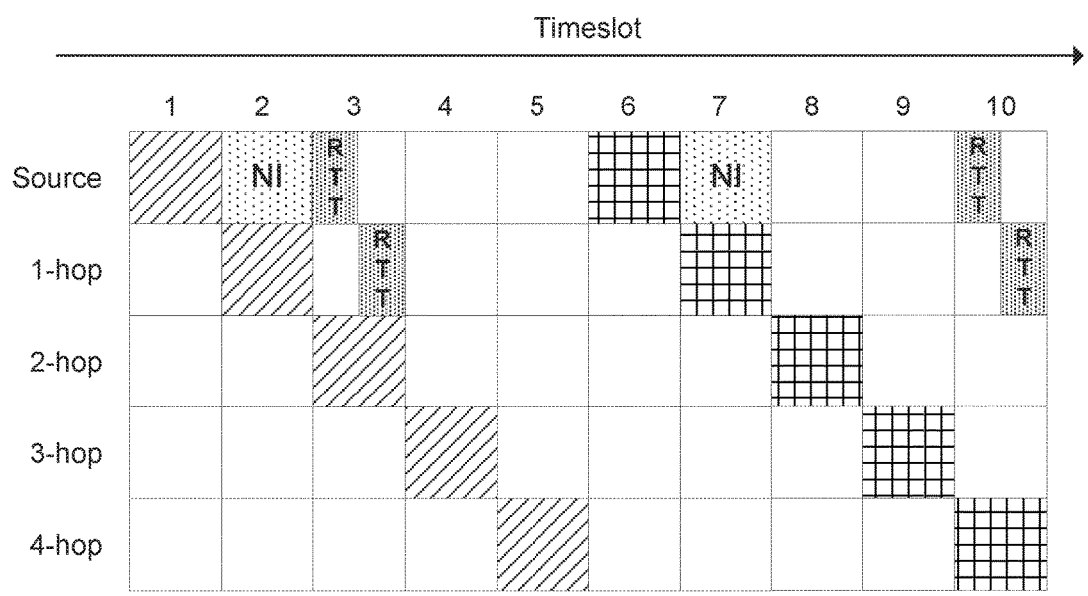

FIGS. 5A and 5B shows assignments of timeslots in a multi-hop wireless network with no spatial pipelining and a network radius of 5, when using the local re-use protocol, according to embodiments of the present invention. FIGS. 5A and 5B include certain timeslot assignments that are similar to those shown in FIGS. 4A and 4B and described above. At least some of these timeslot assignments may not be separately described in this section.

In contrast to FIGS. 4A and 4B, FIGS. 5A and 5B show the second relayed transmission (shown with cross-hatching) starting in timeslot 6, which is after the first relayed transmission (shown with linear hatching) has finished propagating through the 5-hop network. That is, there is no spatial pipelining, i.e. SPF=5 (the network radius), since a relayed transmission is allowed to propagate through the entire network prior to a new transmission beginning.

FIG. 5A shows timeslot assignments for the local re-use protocol, according to an embodiment of the present invention. In the wireless network with a network radius of 5, the source transmits a first data transmission in timeslot 1, which is then propagated throughout the network by the relay nodes over timeslots 2-5. While this first data transmission is being relayed, the source transmits network information (NI) in timeslot 2 and node/neighborhood information (NNI) in timeslot 3. Similarly, NI and NNI are transmitted in the timeslots immediately after the source transmits the second data transmission. In another embodiment, NI and NNI may be transmitted in non-adjacent timeslots, and either transmission may be sent first.

The first (with linear hatching) and second (with cross-hatching) data transmissions that start in timeslots 1 and 6, respectively, are scheduled transmissions that broadcast data network-wide, whereas the NI and NNI transmissions are unscheduled transmissions that re-use network resources locally without impacting the scheduled data transmissions. NI and NNI messages are directed towards nodes that are one hop away from the source, and are transmitted between the scheduled data transmissions.

The NI transmission is intended for nodes that are one-hop away from the source node, but do not currently belong to the wireless network, whereas the NNI transmission is intended for one-hop nodes that are part of the same network as the source node. In an embodiment, NI comprises information that enables out-of-network nodes to join the network. Specifically, the information transmitted may include network information, e.g. current network size, and timing for the network, e.g. at what exact time a timeslot begins.

FIG. 5B shows timeslot assignments for the local re-use protocol, according to another embodiment of the present invention. In an embodiment, the NNI transmission may be the RTT request and response that was discussed above in the context of FIG. 4B. As shown in FIG. 5B, NI is transmitted in timeslot 2, and the RTT request and response is transmitted and received in first and second portions of timeslot 3, respectively. The RTT request transmitted in the first portion of timeslot 3 will be responded to by in-network nodes that meet a criterion specified in the RTT request. In an embodiment, the criterion may be possession of a more accurate time reference than neighboring nodes.

Since out-of-network nodes are typically unable to instantly join the network after having received NI in the previous timeslot, the RTT request transmitted by the source in the first portion of timeslot 3 will be received and evaluated only by in-network nodes.

In an embodiment that oversimplifies network operation, it may be assumed that an out-of-network node requires two timeslots to join the current network. In this case, the RTT request transmitted in the first portion of timeslot 10 will be responded to by both in-network nodes, as well as previously out-of-network nodes that had joined the network using the NI transmissions in timeslots 2 or 7. That is, all nodes that are currently part of the network, and meet the criterion specified in the RTT request, will transmit the RTT response that is received by the source in the second portion of timeslot 10. Furthermore, those previously out-of-network nodes that we able to join the network based on the NI transmission in timeslot 2 will also receive the second data signal transmission (shown with cross-hatching) that starts in timeslot 6.

In general, a more realistic embodiment of network operation may assume that out-of-network nodes may require tens of timeslots in order to join the network. Upon joining the network, these previously out-of-network nodes (and now in-network nodes) will receive data signal and NNI transmissions, and be able to respond to RTT requests.

The basic spatially-pipelined broadcast mechanism shown in FIG. 3B, however, is susceptible to failure at each of the hops. If nodes at a certain hop-distance away from the source node are not able to successfully receive the transmission, it cannot be relayed to nodes that lie further away from the source. This failure scenario is catastrophic if the link between the source node and its one-hop neighbors is fragile, since now the transmission cannot be disseminated through the network.

In order to ensure that mission critical and/or high-priority transmissions are broadcast throughout the wireless network, embodiments of the present invention incrementally employ re-transmissions to ensure reliable broadcasts. That is, power consumption (which increases as the number of re-transmissions increase) is traded-off, in an incremental manner, for communication reliability (which can be interpreted as a decreasing packet error rate or an increasing message completion rate). In scenarios and environments wherein re-transmissions are expected, the TTL field may be set to a value M that is greater than the number of hops N, which ensures that a subsequent (i.e. not necessarily the first) transmission from the source or a relay node will be successfully received by nodes that are a greater number of hops away.

Increasing the number of re-transmissions in a broadcast network is atypical for wireless networks, since wireless network protocols are designed to minimize collisions when using broadcast transmissions. However, embodiments of the present invention propose using re-transmissions to leverage the time- and spatial-diversity that inherently exists between pairs of nodes in a wireless network. That is, if multiple nodes at a certain hop distance re-broadcast their transmissions on subsequent slots, nodes that are one further hop away are more likely to successfully decode the transmission.

In the case of BRNs, collisions are not an issue due to the PHY layer combining implemented at each node. Re-broadcasting the transmission, as discussed in various embodiments of the present invention, will ensure that communication reliability is increased for broadcasts in a BRN, albeit at the expense of increased power consumption.

Table 3 overviews the different broadcast mechanisms with re-transmissions (BMR) that are proposed in the present invention.

TABLE 3

Different broadcast mechanisms with re-transmission (BMR) protocols

| | | |
|---|---|---|
| dsBMR | Double-source-transmit | Source node re-broadcasts in an additional subsequent timeslot |
| sBMR | Source-recursive | Source node re-broadcasts in all available additional timeslots |
| dBMR | Double-transmit | Source node and relay nodes re-broadcast in an additional subsequent timeslot |
| rBMR | Recursive | Source node and relay nodes re-broadcast in all available additional timeslots |
| pBMR | Priority-data | Source nodes and relay nodes re-broadcast in a timeslot two timeslots after the original broadcast timeslot |

Figure 6A:
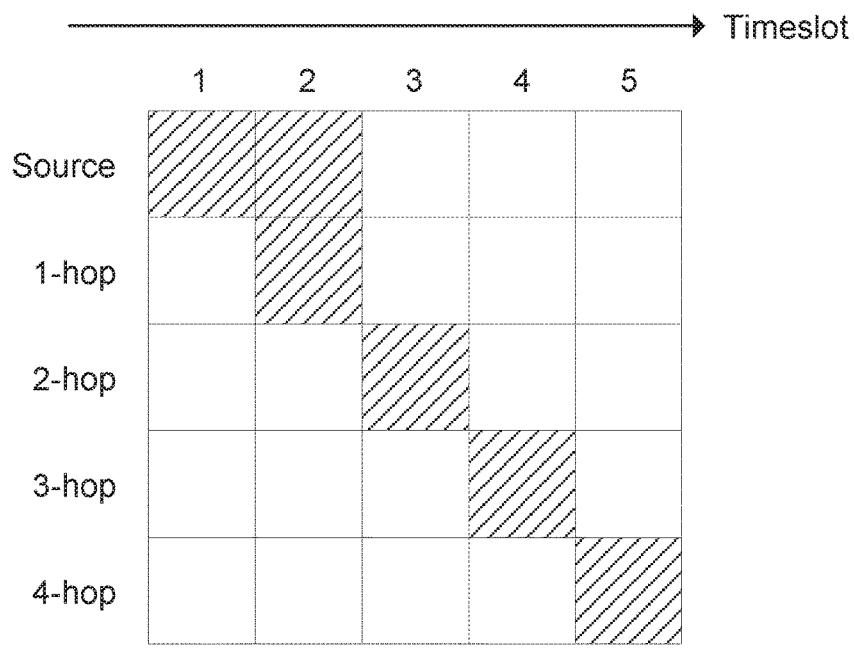
FIGS. 6A and 6B show assignments of timeslots in a multi-hop network for the double-source-transmit broadcast mechanism with re-transmissions (dsBMR) protocol, according to an embodiment of the present invention.
Figure 6B:
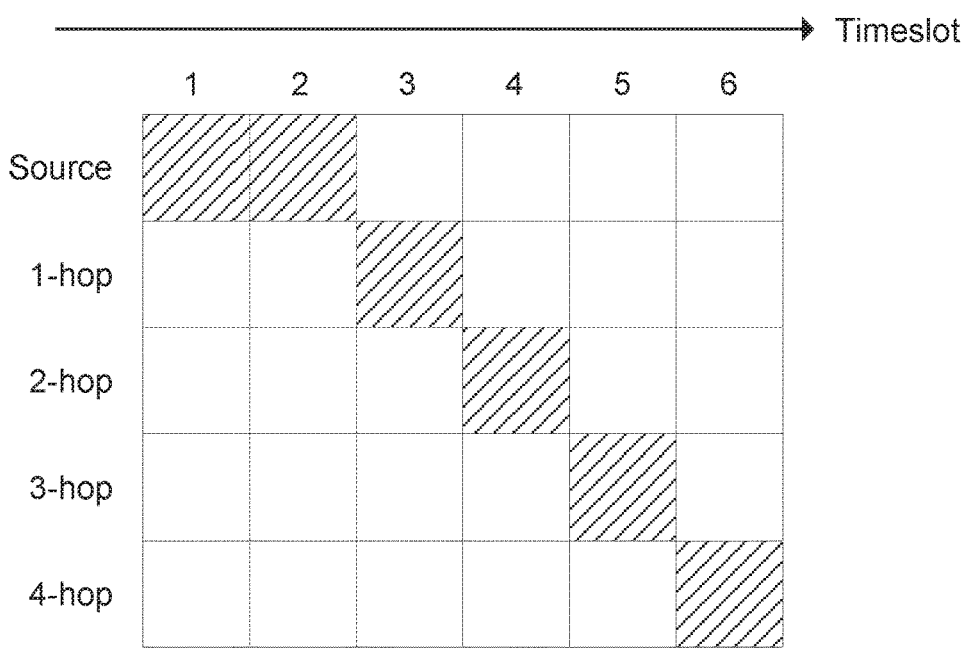

FIGS. 6A and 6B show an assignment of timeslots for the double-source-transmit broadcast mechanism with re-transmissions (dsBMR) protocol, according to an embodiment of the present invention. As seen in both FIGS. 6A and 6B, the source node broadcasts the transmission in a first timeslot. Based on evaluating the trade-off between power consumption and communication reliability, the source node re-broadcasts the transmission in a second timeslot subsequent to the first timeslot. FIG. 6A depicts the nodes that are one-hop away receiving the transmission in the first timeslot, and broadcasting it on the subsequent second timeslot in order to disseminate the transmission network-wide. In contrast, FIG. 6B depicts the one-hop neighbors being unable to successfully decode the transmission on the first timeslot, but being able to do so on the second timeslot, and broadcasting it on the third timeslot.

Since the source is configured to re-broadcast the transmission based on the evaluation, the TTL field is set higher than the number of hops over which the broadcast must disseminate to ensure its network-wide propagation. In the embodiments described in FIGS. 6A and 6B, setting the TTL field, for example, to a value of 6 (in a 4-hop wireless network) will ensure the transmission is broadcast network-wide.

Evaluating the trade-off between power consumption and communication reliability enables to the source node to re-broadcast the transmission in a second timeslot, which ensures the network-wide dissemination of the transmission in the case of FIG. 6B. In an embodiment, the evaluation may be based on one or more of the following factors: the number of one-hop neighbors of a node in the wireless network, a set of link qualities between the node and its one-hop neighbors, previously collected statistics for packet error rate (PER), bit error rate (BER) and message completion rate (MCR), a type and/or priority of the transmission, and a state of the node. In an example, the state of the node may be represented by detectability constraints (e.g., how often a node should broadcast a transmission lest it be discovered due to frequent transmissions) and/or the battery level of the node.

Figure 7A:
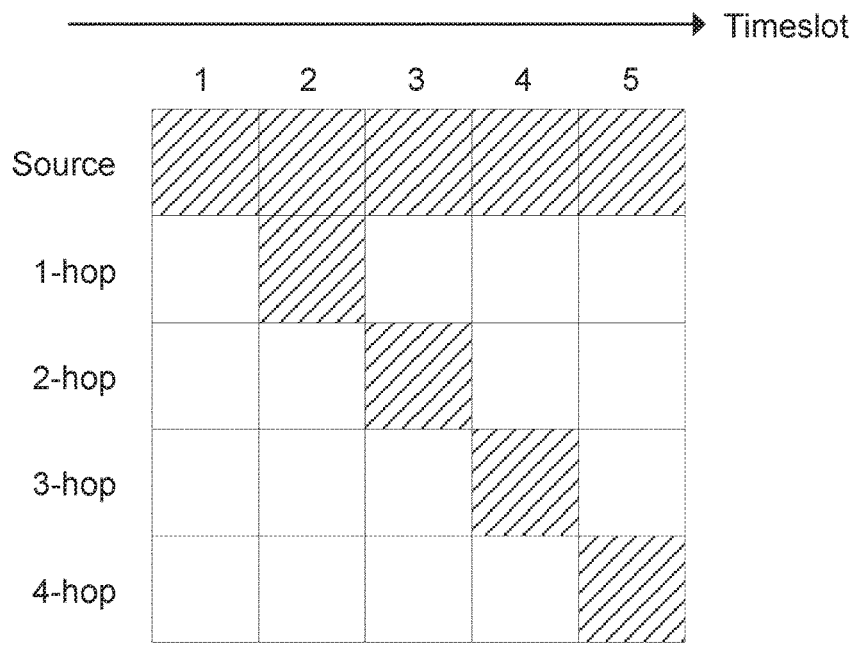
FIGS. 7A and 7B show assignments of timeslots in a multi-hop network for the source-recursive broadcast mechanism with re-transmissions (sBMR) protocol, according to an embodiment of the present invention.
Figure 7B:
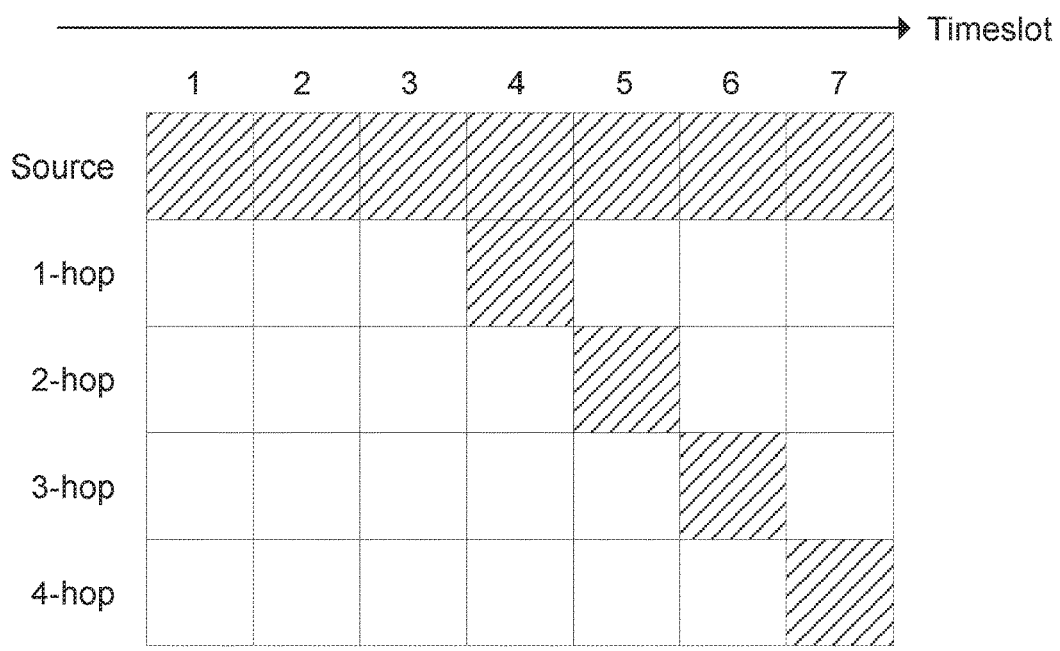

In another embodiment, the link between the source node and the other nodes in the wireless network may be fragile. That is, the source node may be a network-edge node that needs to communicate information to the remainder of the network, but is unable to move closer to the other nodes. FIG. 7A and FIG. 7B show an assignment of timeslots for source-recursive broadcast mechanism with re-transmissions (sBMR) protocol, according to embodiments of the present invention, that are well-suited to the use case described above.

As shown in FIGS. 7A and 7B, the source node broadcasts the transmission in a first timeslot. An evaluation of the trade-off between power consumption and communication reliability may direct the decision to include additional re-transmissions, in comparison to the dsBMR protocol. That is, the source node may re-broadcast the transmission on each available timeslot subsequent to the first timeslot based on the evaluation (timeslots 2-5 in FIG. 7A).

The one-hop neighbors of the source node receive the transmission in the first timeslot in FIG. 7A, and broadcast the transmission in timeslot 2. However, as seen in FIG. 7B, one-hop neighbors of the source node may be unable to successfully receive the transmission until timeslot 3, and then re-broadcast the transmission on the subsequent timeslot to ensure network-wide dissemination of the transmission.

The sBMR protocol enables the source node to continually re-broadcast a critical transmission on each available timeslot thereby overcoming the fragility of the first hop. The fragility of the first hop may be due to an increased distance between the source node and the remainder of the network. Alternatively, a higher interference environment may exist around the source node. For example, a source node at a network edge may be in the vicinity of another network whose communications are adversely impacting communications between the source node and the other nodes in its network.

Figure 8:
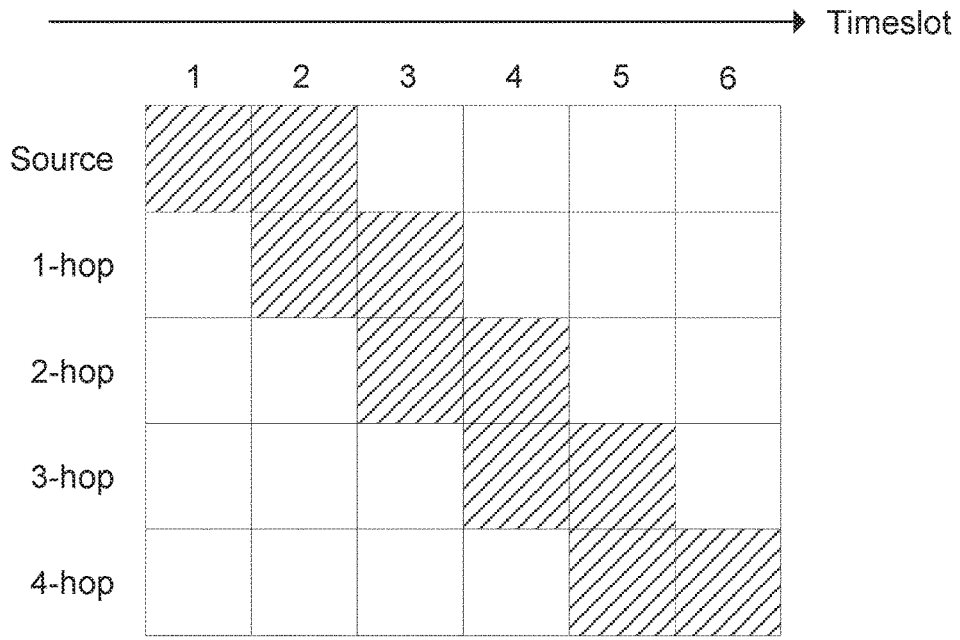
FIG. 8 shows an assignment of timeslots in a multi-hop network for the double-transmit broadcast mechanism with re-transmissions (dBMR) protocol, according to an embodiment of the present invention.

FIG. 8 shows an assignment of timeslots for double-transmit broadcast mechanism with re-transmissions (dBMR) protocol, according to embodiments of the present invention. The dBMR protocol trades power consumption for an increased reliability for all the hops in the wireless network. That is, the source node transmits on a first timeslot and a second timeslot that is subsequent to the first timeslot. Similarly, each of the relay nodes is configured to broadcast a received transmission on a subsequent timeslot and the one following it based on the evaluation. As discussed above in the context of the dsBMR and sBMR protocols, the relay nodes need not necessarily receive the broadcast transmission from the source node (or previous hop) on the first transmission timeslot. In fact, the possibility of receiving the transmission on the second timeslot is what enables the increased robustness of embodiments of the present invention, as compared to the basic broadcast mechanism.

As discussed above, nodes employing the dBMR protocol re-broadcast the transmission, based on the evaluation, to enable nodes that are a greater number of hops away to successfully receive the transmission over two timeslots. For example, in a 4-hop wireless network, the TTL field may be set to 10 to maximize the probability of network-wide dissemination of the transmission.

Figure 9:
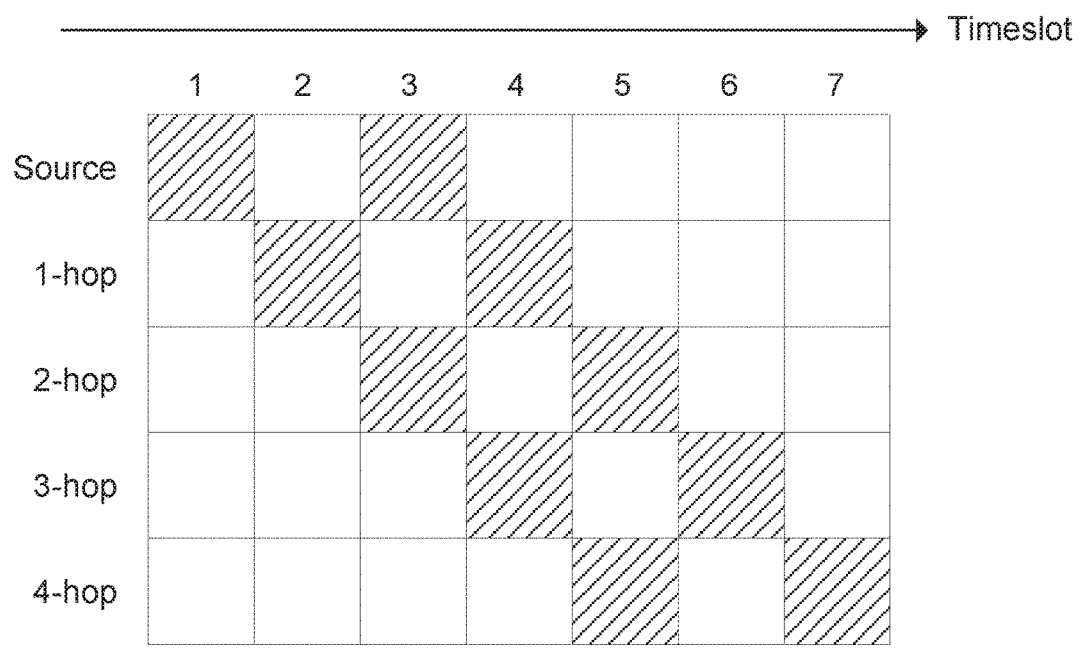
FIG. 9 shows an assignment of timeslots in a multi-hop network for the priority data broadcast mechanism with re-transmissions (pBMR) protocol, according to an embodiment of the present invention.

FIG. 9 shows an assignment of timeslots for the priority-data broadcast mechanism with re-transmissions (pBMR) protocol, according to embodiments of the present invention. The pBMR protocol supports the reliable broadcast of high-priority data in a wireless network. That is, it ensures that high-priority data is received by each node in the wireless network, even in the presence of other nodes broadcasting standard-priority transmissions.

The pBMR protocol provides for every node in the wireless network to broadcast a transmission in a timeslot subsequent to the timeslot in which it was received, as well as in a timeslot that is some number of timeslots (e.g., two timeslots) later. As shown in FIG. 9, the transmission is broadcasted by the source node in timeslot 1, and then re-broadcasted in timeslot 3, with the relay nodes operating in a similar manner. The efficacy of the pBMR protocol in ensuring the reliable broadcast of high-priority data throughout a wireless network will be further evidenced in the context of FIGS. 12-14.

Figure 10A:
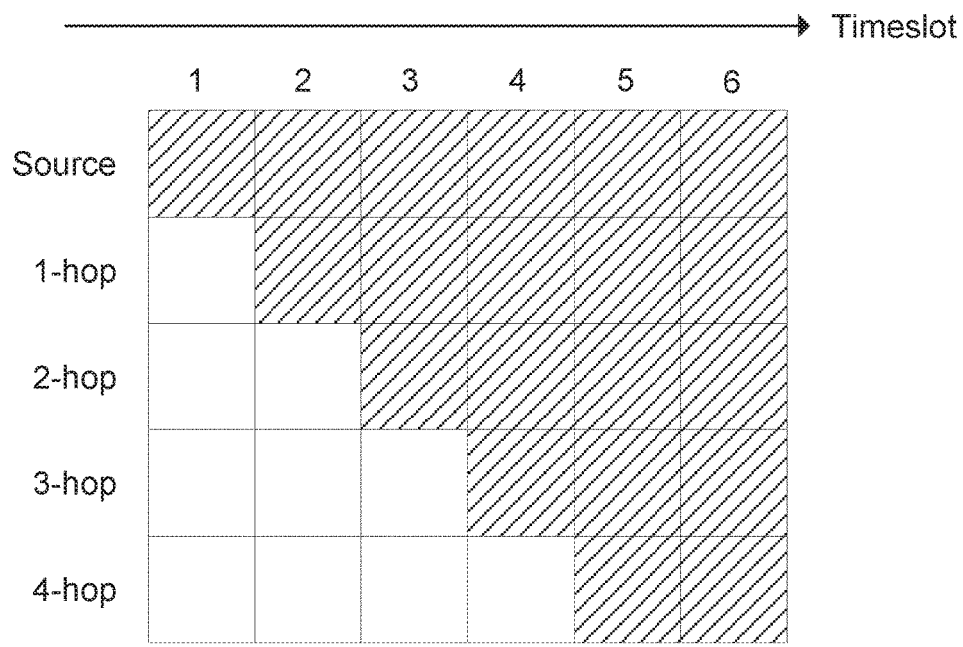
FIGS. 10A and 10B show assignments of timeslots in a multi-hop network for the recursive broadcast mechanism with re-transmissions (rBMR) protocol, according to an embodiment of the present invention.
Figure 10B:
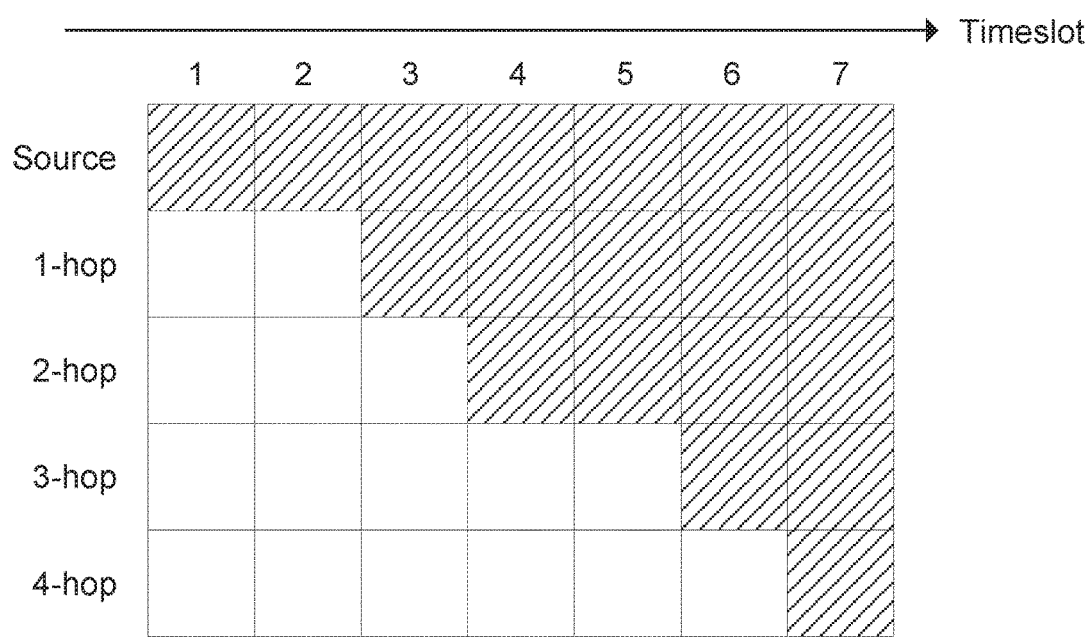

In communication environments with high levels of interference, embodiments of the present invention are able to provide a more drastic trade-off between power consumption and communication reliability. FIGS. 10A and 10B show an assignment of timeslots for the recursive broadcast mechanism with re-transmissions (rBMR) protocol, according to embodiments of the present invention. In both FIGS. 10A and 10B, the source node broadcasts the transmission in a first timeslot, and continues to re-broadcast the transmission in each subsequent timeslot in an attempt to overcome the high levels of interference. Similarly, relay nodes re-broadcast the transmission in each available timeslot subsequent to the timeslot in which the transmission is received.

In FIG. 10A, each of the relay nodes receive the transmission on the first transmission attempt by the source node (or the nodes at the hop before it), and continue to re-broadcast the transmission in every subsequent timeslot. FIG. 10B depicts a similar scenario, but the relay nodes do not necessarily receive the transmission on the first broadcast attempt. Re-broadcasting the transmission in each available timeslot increases the probability of network-wide dissemination of the transmission, but at the expense of power consumption since every node continues to re-broadcast the transmission on every available subsequent slot.

Figure 11A:
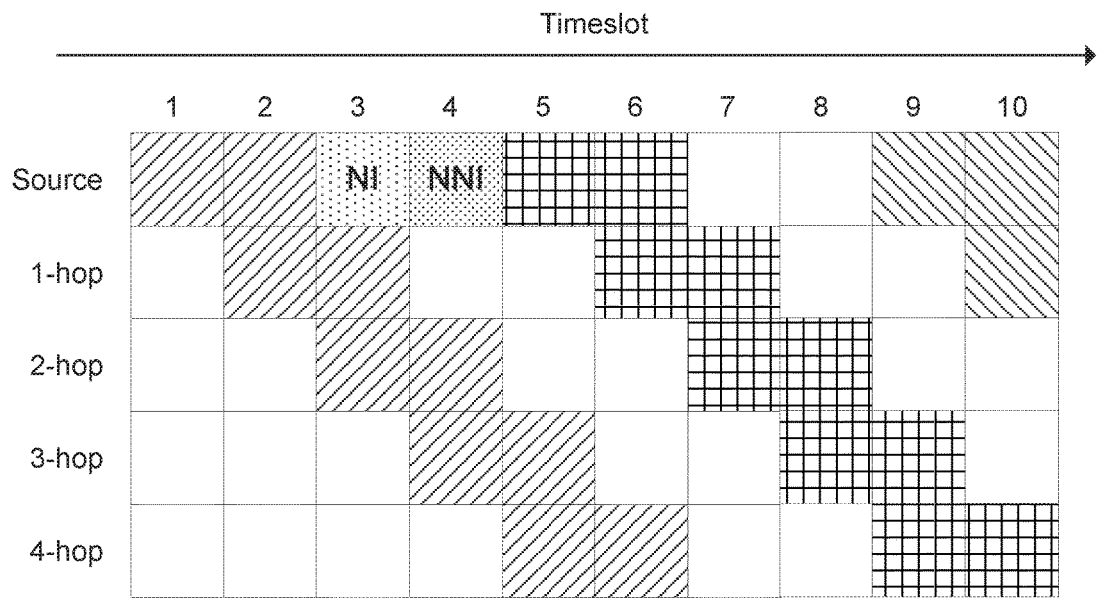
FIGS. 11A and 11B show assignments of timeslots in a multi-hop network for a combination of the dBMR and local re-use protocols, according to an embodiment of the present invention.
Figure 11B:
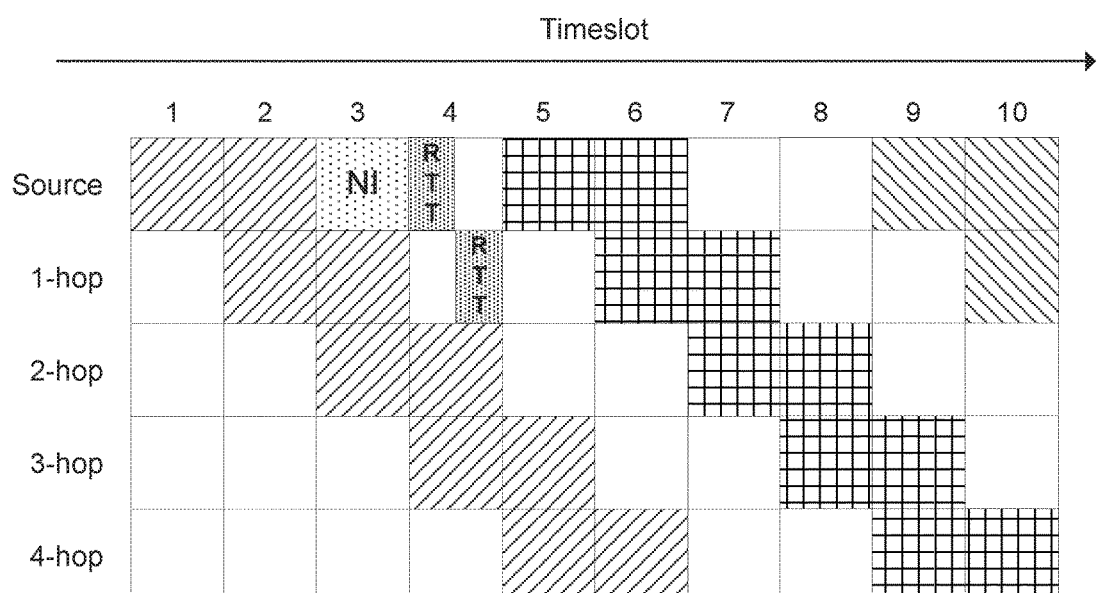

In an embodiment, a broadcast mechanism with re-transmissions may be used in conjunction with the local re-use protocols to ensure reliable broadcast capabilities as well as efficient bandwidth usage. FIGS. 11A and 11B show assignments of timeslots in a multi-hop network for a combination of the dBMR and local re-use protocols, according to an embodiment of the present invention. FIGS. 11A and 11B include certain timeslot assignments that are similar to those shown in FIGS. 5A, 5B and 8, and described above. At least some of these timeslot assignments may not be separately described in this section As shown in FIG. 11A, the source node transmits a first data transmission in timeslot 1 and then redundantly in timeslot 2 to increase the probability of its reception by the one-hop nodes in the network. These transmissions are propagated by the relay nodes at each hop, as in the case of FIG. 8. The source node additionally transmits NI in timeslot 3 to out-of-network nodes that are one-hop away from the source node, and then transmits NNI to in-network one-hop nodes in timeslot 4. The source node continues with the redundant transmission of a second data transmission in timeslots 5 and 6. FIG. 11B shows timeslot assignments that are similar to those shown in FIG. 11A, and in an embodiment, shows the RTT request and response messages that are an example of NNI.

As described earlier, FIGS. 12-14 show timelines that demonstrate the efficacy of the pBMR protocol in reliably disseminating a transmission network-wide. The timelines shown in FIGS. 12-14 are representative of the functionality of embodiments of the present invention, but are not meant to be limiting with regard to, for example, the number of nodes shown and the initialization of transmissions (except where the context excludes that possibility).

Figure 12:
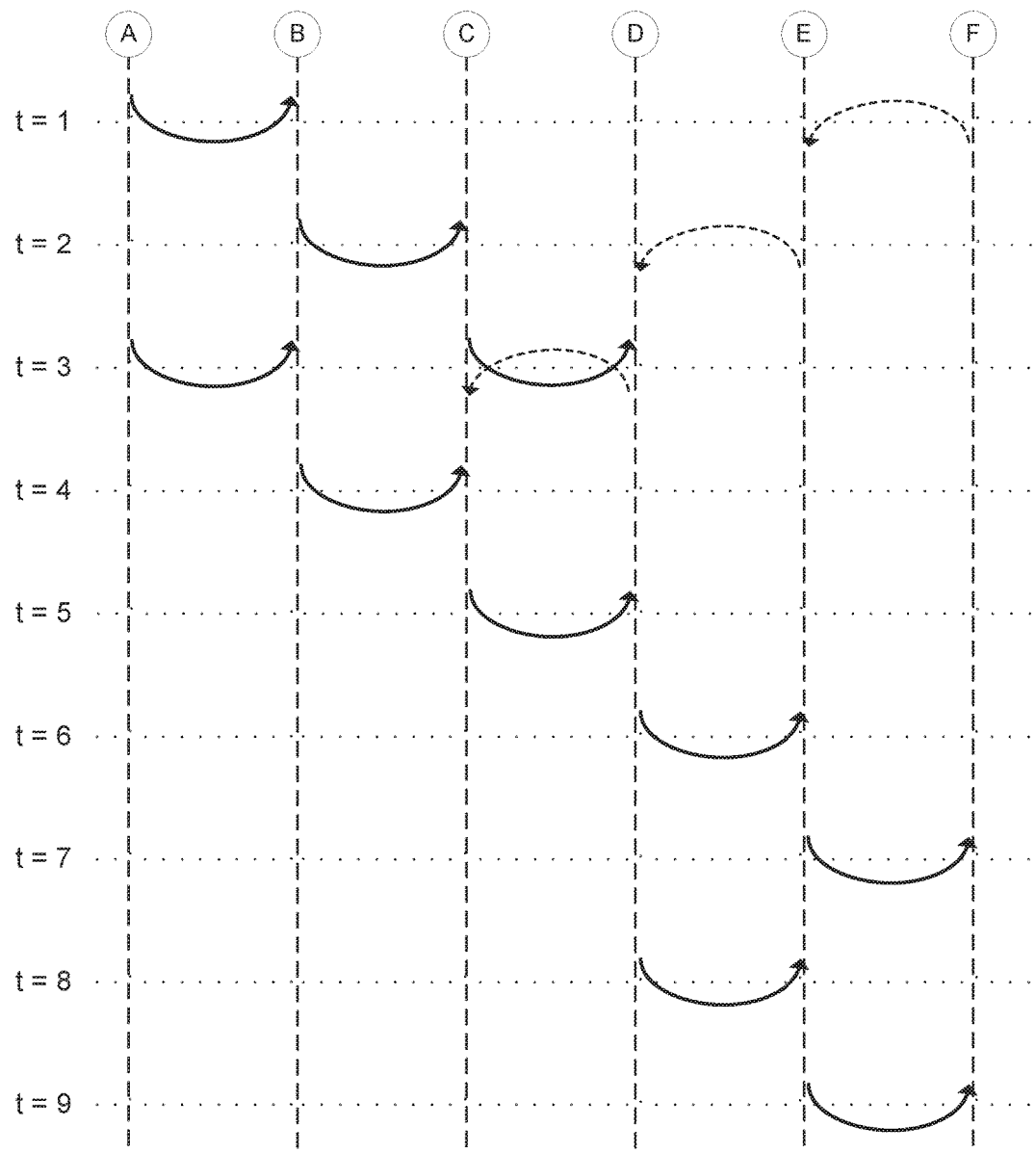
FIG. 12 shows a first timeline of events describing the priority data broadcast mechanism with re-transmissions protocol, according to an embodiment of the present invention.

FIG. 12 shows a timeline of events describing the priority data broadcast mechanism with re-transmissions (pBMR) protocol, wherein node A initiates a high-priority transmission (show using a solid line) at time t=1. Simultaneously, node F initiates a standard-priority broadcast transmission (shown using a dashed line). The high-priority transmission propagates through nodes B and C, while the standard-priority transmission is relayed by nodes E and D. At time t=3, Node C broadcasts the high-priority transmission and Node D broadcasts the standard-priority transmission. A simultaneous broadcast of the high- and standard-priority transmissions prevents either of nodes C and D from being able to successfully decode either transmission.

However, at time t=3, which is two timeslots after time t=1, the first source node (Node A) re-broadcasts the high-priority transmission in accordance with embodiments of the present invention. The pBMR protocol requires the re-broadcast of the high-priority transmission, which is now able to propagate (via relaying through nodes B through E) network-wide, eventually reaching Node F in time t=9. Thus, the pBMR protocol is robust to collisions of the high-priority broadcasts with standard-priority broadcasts. Note that the pBMR protocol does not guarantee the dissemination of the standard-priority transmission, but ensures that the high-priority transmission is broadcast network-wide.

Figure 13:
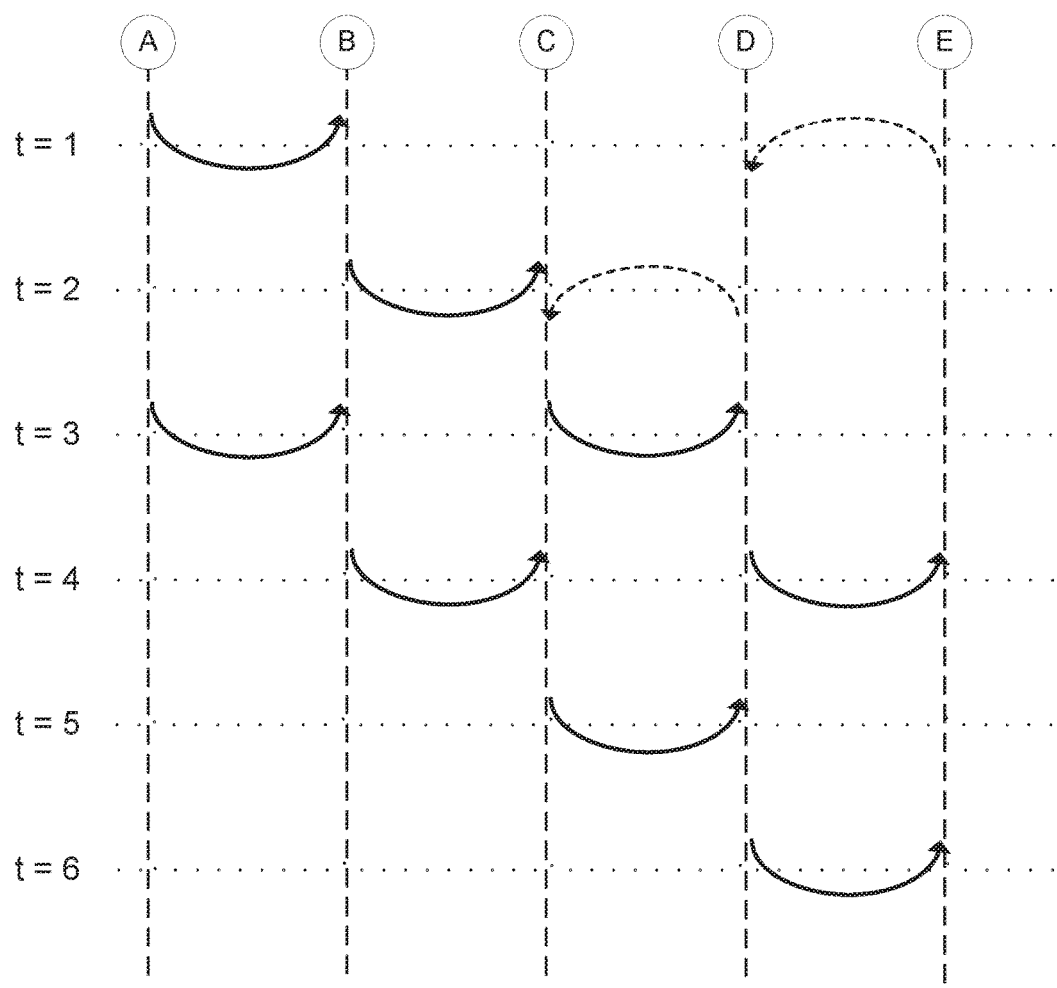
FIG. 13 shows a second timeline of events describing the priority data broadcast mechanism with re-transmissions protocol, according to an embodiment of the present invention.
Figure 14:
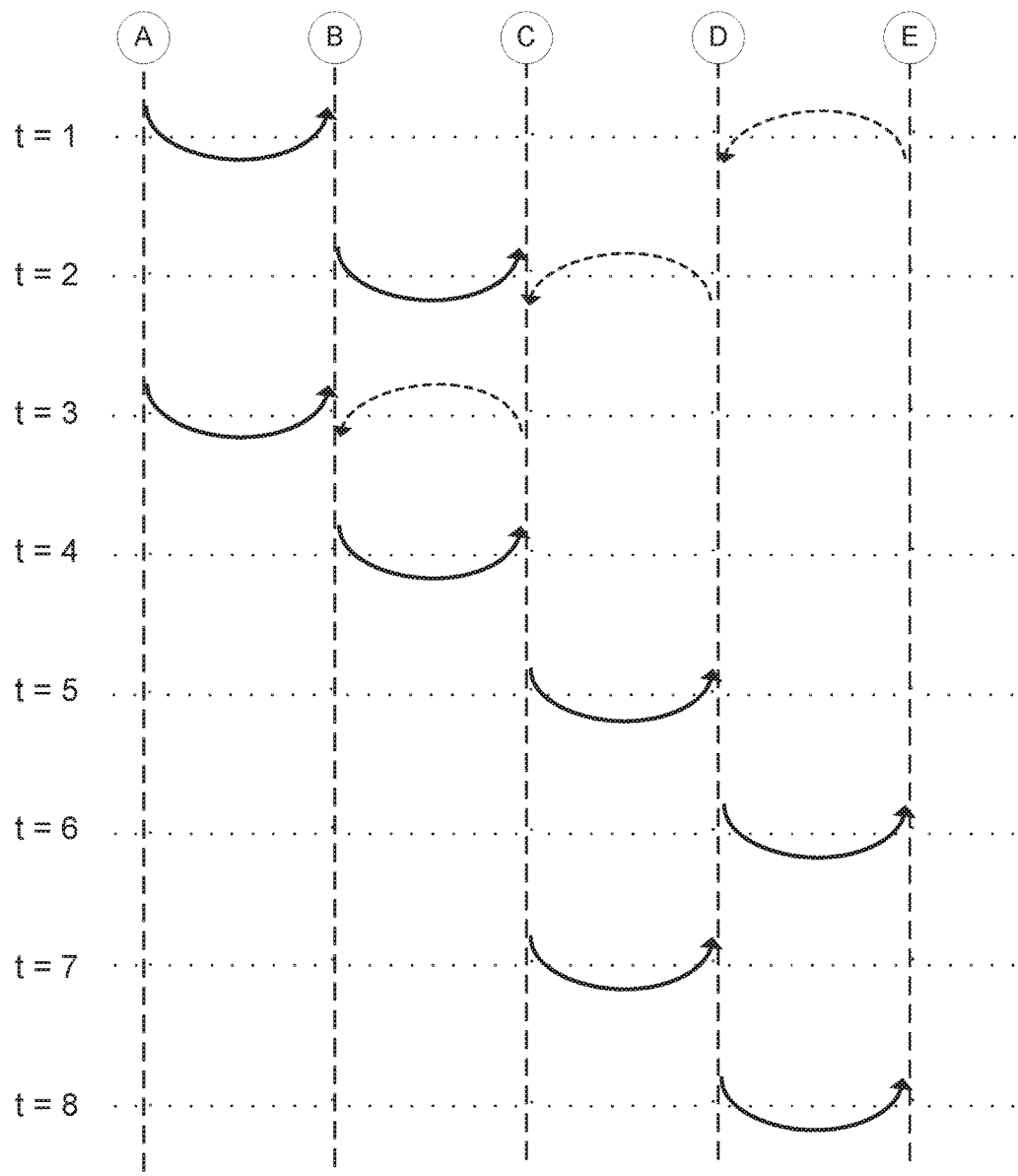
FIG. 14 shows a third timeline of events describing the priority data broadcast mechanism with re-transmissions protocol, according to yet another embodiment of the present invention.

FIG. 13 shows another timeline of events describing the priority data broadcast mechanism with re-transmissions (pBMR) protocol, according to an embodiment of the present invention. This embodiment includes some timeline events and/or steps that are similar to those shown in FIG. 12 and described above. At least some of these timeline events and/or steps may not be separately described in this section.

As shown in FIG. 13, at time t=2, node C receives the high-priority transmission from node B as well as the standard-priority transmission from node D. In this example, node C is able to successfully decode the high-priority transmission at time t=2, and broadcasts the high-priority transmission in times t=3 and t=5, in accordance with some embodiments of the present invention. In this example, the standard-priority transmission is not successfully decoded by node C, and does not affect the network-wide dissemination of the high-priority transmission.

FIG. 14 shows yet another timeline of events describing the priority data broadcast mechanism with re-transmissions (pBMR) protocol, according to an embodiment of the present invention. This embodiment includes some timeline events and/or steps that are similar to those shown in FIGS. 12 and 13, and described above. At least some of these timeline events and/or steps may not be separately described in this section.

As shown in FIG. 14, and similar to FIG. 13, at time t=2, node C receives the high-priority transmission from node B as well as the standard-priority transmission from node D. However, in contrast to the example in FIG. 13, node C is able to successfully decode the standard-priority transmission at time t=2. At time t=3, node C broadcasts the standard-priority transmission. At time t=4, node C receives the high-priority transmission from the re-broadcast of the high-priority transmission at time t=1 from node A, and the relaying of this second re-broadcast at time t=4 by node B. Node C re-broadcasts the high-priority transmission at t=5, and it is disseminated to node E by time t=8. Further note that node B at time t=3 is in the same position as node C at time t=2. That is, it simultaneously receives the high-priority transmission from node A, as well as the standard-priority transmission from node C. In this example, it is assumed that node B was successfully able to decode the high-priority transmission.

Figure 15:
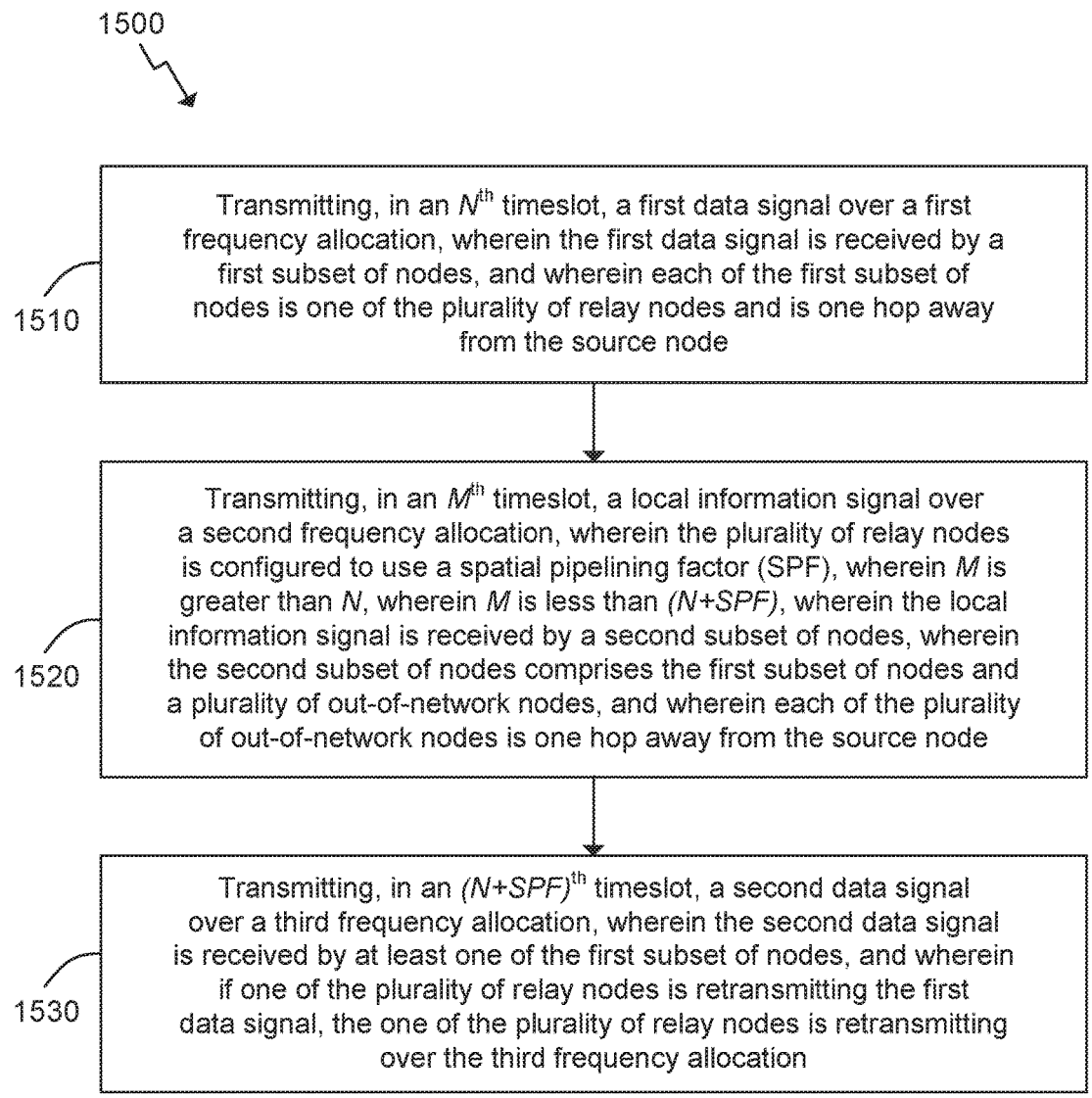
FIG. 15 is a flowchart for a method for the local re-use protocol, according to an embodiment of the present invention.

FIG. 15 depicts a flowchart for an embodiment of the present invention that enables local re-use. The method described herein is presented in the context of a wireless network comprising at least a source node, a plurality of relay nodes and a plurality of out-of-network nodes, where each of the out-of-network nodes is one hop away from the source node, and where the wireless network is configured to use a spatial pipelining factor (SPF). Furthermore, some of the steps in the flowchart may be skipped or additional steps added.

The method begins at 1510, wherein the source node transmits a first data signal over a first frequency allocation in an $N^{th}$ timeslot, which is received by a first subset of nodes, where each of the first subset of nodes is an in-network relay node that is one hop away from the source node. The first data signal is propagated through the network by in-network nodes that relay the signal in subsequent timeslots. In an embodiment, the nodes may use the same first frequency allocation to relay the first data signal, whereas in other embodiments, the nodes may use distinct frequency allocations at each hop of the wireless network.

At step 1520, the source node transmits a local information signal over a second frequency allocation in an $M^{th}$ timeslot, where M>N and M<(N+SPF). The local information signal is received by a second subset of nodes, which comprises the first subset of nodes and the out-of-network nodes. That is, the local information signal is transmitted to one-hop nodes while the first data signal is being propagated through the wireless network by the relay nodes.

In an embodiment, the local information signal may be a late net entry (LNE) message that is received by the out-of-network nodes, and enables them to join the current network. The LNE message comprises timing and network information (for example, the size of the network), which allows the out-of-network nodes to align with the timeslots of the current network and receive subsequent data signals transmitted by the source node. In another embodiment, the local information signal may be an RTT request that is received by the one-hop in-network nodes, and enables those nodes with a more accurate timing reference to transmit an RTT response. As discussed previously, the second frequency allocation may be identical or orthogonal to the first frequency allocation.

At step 1530, the source node transmits a second data signal over a third frequency allocation in an $(N+SPF)^{th}$ timeslot. That is, the local re-use transmission in the $M^{th}$ timeslot described in step 1520 occurs in between consecutive data signal transmissions. The second data signal is received by at least one of the first subset of nodes, which will relay this signal in subsequent timeslots. In this embodiment, the wireless network uses a SPF that is less than the network radius, and any other relay nodes that are relaying a previous data signal through the wireless network in the $(N+SPF)^{th}$ timeslot will use the third frequency allocation.

In another embodiment, wherein at least one previously out-of-network node has joined the network between the $M^{th}$ and $(N+SPF)^{th}$ timeslots, the second data signal transmitted in step 1530 is received by at least one of the second subset of nodes.

Figure 16:
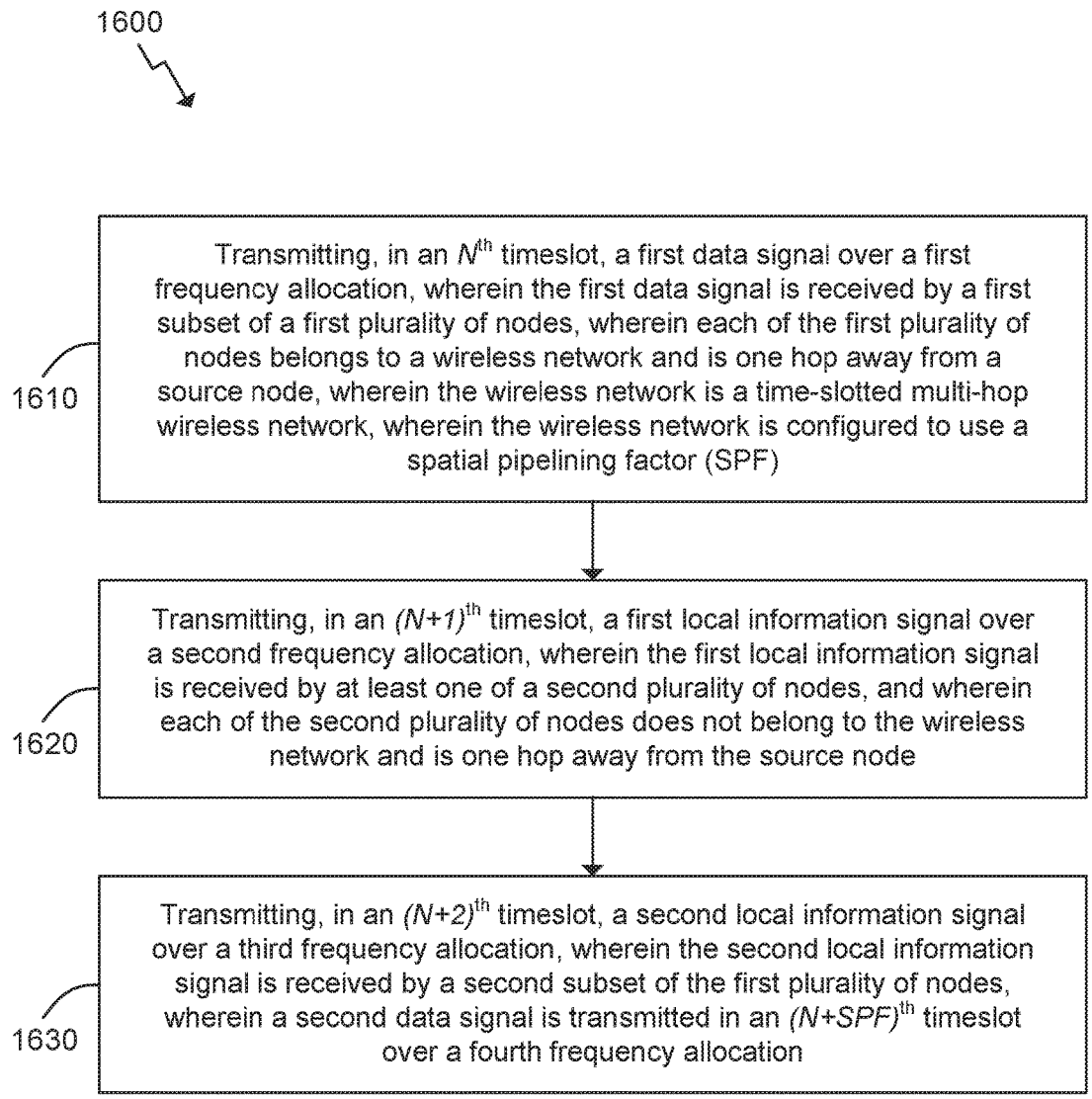
FIG. 16 is a flowchart for another method for the local re-use protocol, according to an embodiment of the present invention.

FIG. 16 depicts a flowchart for another embodiment of the present invention that enables local re-use. The method described herein is presented in the context of a wireless network comprising one or more source nodes, a first plurality of nodes (each of which is one hop away from a first source node and part of the same wireless network as the first source node) and a second plurality of nodes (each of which is one hop away from the first source node, and does not belong to the wireless network). The wireless network may be further configured to use a spatial pipelining factor (SPF). Furthermore, some of the steps in the flowchart may be skipped or additional steps added.

The method begins at step 1610, wherein the first source node transmits a first data signal over a first frequency allocation in an $N^{th}$ timeslot, which is received by a first subset of a first plurality of nodes, where each of the first plurality of nodes is an in-network relay node that is one hop away from the source node. This data signal is propagated through the wireless network by the relay nodes over subsequent timeslots.

At step 1620, the first source node transmits a first local information signal over a second frequency allocation in an $(N-1)^{th}$ timeslot. This transmission is received by at least one of the second plurality of nodes, and in an embodiment, may be an LNE message. The second frequency allocation may be identical or orthogonal to the first frequency allocation.

At step 1630, the first source node transmits a second local information signal over a third frequency allocation in an $(N|2)^{th}$ timeslot. This transmission is received by a second subset of the first plurality of nodes, and in an embodiment, may be an RTT request message that is transmitted in a first portion of the $(N+2)^{th}$ timeslot.

In an $(N+SPF)^{th}$ timeslot, a second data signal is transmitted over a fourth frequency allocation. In an embodiment, the first and second data signals may be transmitted by the same source node, whereas in another embodiment, the second data signal may be transmitted by a second source node that is different from the first source node.

As discussed previously, the first and second local information signals are transmitted by the first source node in between scheduled data signal transmissions (in timeslots N and N+SPF). That is, the local information that is transmitted need not be explicitly scheduled since it only affects one-hop nodes that are not scheduled to transmit in those timeslots.

In another embodiment, a second source node may transmit the second data signal. Since the SPF is equal to the network radius, there is no spatial pipelining. That is, a message transmitted from a source node propagates through the entire wireless network prior to a new transmission beginning. Thus, a different source may transmit the second data signal with no chance of collision between the first and second data signals.

FIGS. 17-20 depict flowcharts for embodiments of the present invention that enable reliable broadcasts using re-transmissions. The methods described herein are presented in the context of a wireless network comprising at least a source node and a plurality of relay nodes, wherein at least one of the relay nodes is N hops away from the source node.

Figure 17:
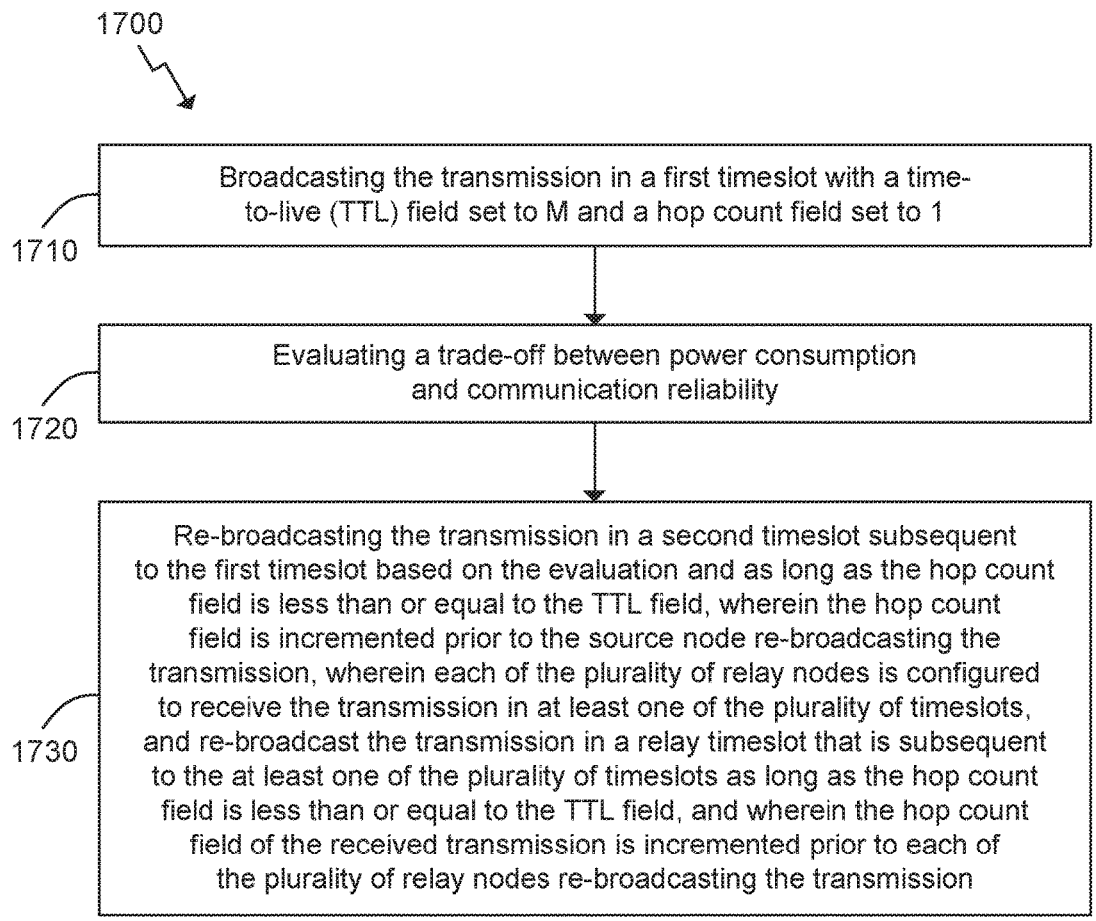
FIG. 17 is a flowchart for a method for the dsBMR protocol, according to an embodiment of the present invention.

FIG. 17 is a flowchart for a method based on the double-source-transmit broadcast mechanism with re-transmissions (dsBMR), according to an embodiment of the present invention. In some embodiments, the order of the steps may be changed. Furthermore, some of the steps in the flowchart may be skipped or additional steps added. The method 1700 begins at 1710, wherein the source node broadcasts a transmission in a first timeslot with a time-to-live (TLL) field set to N and a hop count field set to 1.

At step 1720, the source node evaluates a trade-off between power consumption and communication reliability. In an embodiment, the power consumption may be interpreted as the estimated battery usage based on the number of re-transmissions required to maintain reliable communications in the wireless network. That is, the source node may estimate the number of re-transmissions needed to maintain a certain message completion rate or packet/bit error rate, or based on the interference level or signal-to-noise ratio, and evaluate the estimate against the level of remaining battery or detectability constraints.

At step 1730, the source node increments the hop count to 2, and re-broadcasts the transmission in a second timeslot that is subsequent to the first timeslot based on the evaluation of the trade-off between power consumption and communication reliability. At least one of the one-hop neighbors of the source node are able to receive (and successfully decode) the broadcast transmission in the first and/or second timeslots, increment the hop count, and then relay it in a subsequent timeslot as long as the hop count is less than or equal to the TTL field.

Nodes in the wireless network that implement the dsBMR protocol, according to an embodiment of the present invention, evaluate the trade-off between power consumption and communication reliability, and re-broadcast the transmission one more times to increase the probability of the relay nodes being able to successfully decode the broadcast transmission.

Figure 18:
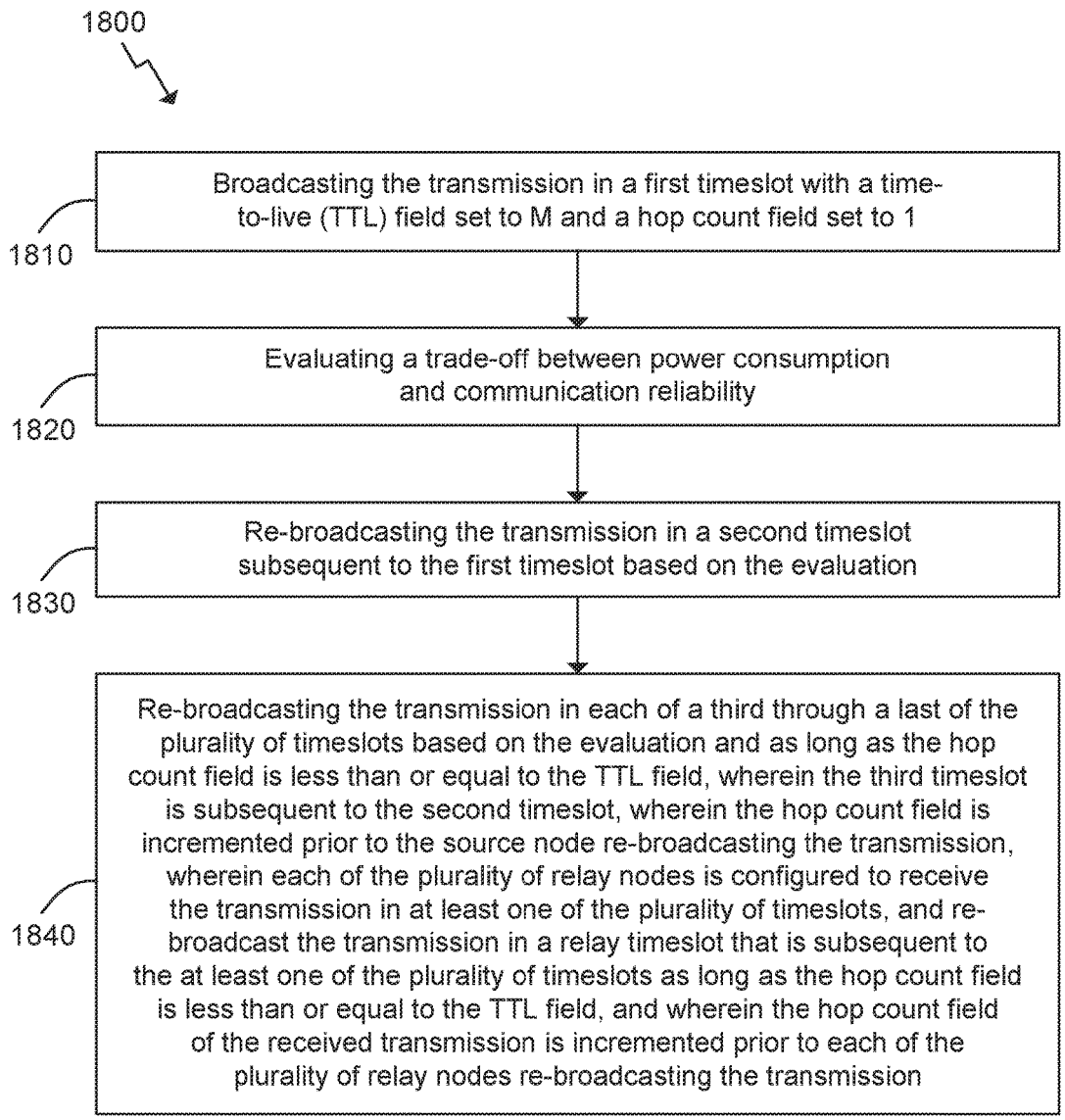
FIG. 18 is a flowchart for a method for the sBMR protocol, according to an embodiment of the present invention.

FIG. 18 is a flowchart for a method based on the source-recursive broadcast mechanism with re-transmissions (sBMR), according to an embodiment of the present invention. In some embodiments, the order of the steps may be changed. Furthermore, some of the steps in the flowchart may be skipped or additional steps added. This flowchart includes some steps that are similar to those shown in FIG. 17 and described above. At least some of these steps may not be separately described in this section.

Similar to the dsBMR protocol described in FIG. 17, at step 1830, the source node re-broadcasts the transmission (with the hop count field set to 2) in a second timeslot that is subsequent to the first timeslot based on the evaluation. However, the sBMR protocol adds an additional layer of redundancy in order to improve communication reliability at the expense of power consumption.

As step 1840, the source node re-broadcasts the transmission in each of a third through N-th timeslot based on the evaluation, with the hop count field being incremented prior to each re-broadcast. In scenarios where the first hop between the source node and its one-hop neighbors is fragile (either due to increased distance or increased interference levels), re-broadcasting the transmission in each available timeslot enables the source node to overcome the fragility of the first hop, and ensure that the transmission is disseminated network-wide.

Figure 19:
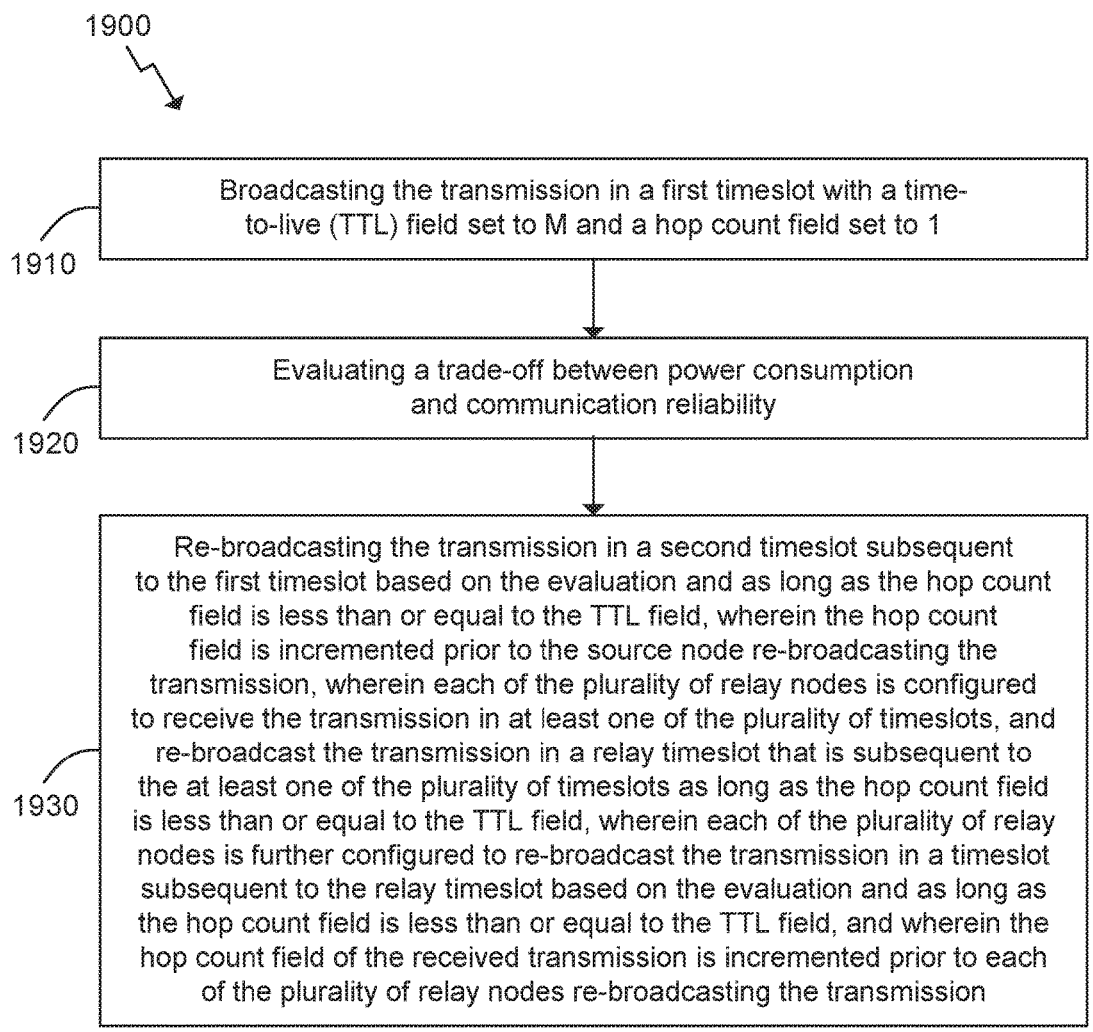
FIG. 19 is a flowchart for a method for the dBMR protocol, according to an embodiment of the present invention.

FIG. 19 is a flowchart for a method based on the double-transmit broadcast mechanism with re-transmissions (dBMR), according to an embodiment of the present invention. In some embodiments, the order of the steps may be changed. Furthermore, some of the steps in the flowchart may be skipped or additional steps added. This flowchart includes some steps that are similar to those shown in FIGS. 17 and 18, and described above. At least some of these steps may not be separately described in this section.

At step 1930, the source node and each relay node re-broadcasts the transmission, based on the evaluation, on a timeslot subsequent to the timeslot of the first transmission and the timeslot in which it was received, respectively. That is, in order to provide redundancy across each of the hops of the wireless network, the source node and each of the relay nodes broadcasts the transmissions in two consecutive timeslots, at the expense of increased power consumption.

In contrast to the dsBMR and sBMR protocols, which are directed towards increasing the redundancy of the first hop from the source node to its one-hop neighbors at the expense of increased power consumption, the dBMR protocol spreads the redundancy throughout the wireless network. In other words, the source node and each of the relay nodes is configured to re-broadcast the transmission in a second timeslot that is subsequent to the timeslot of the first transmission based on the evaluation.

Figure 20:
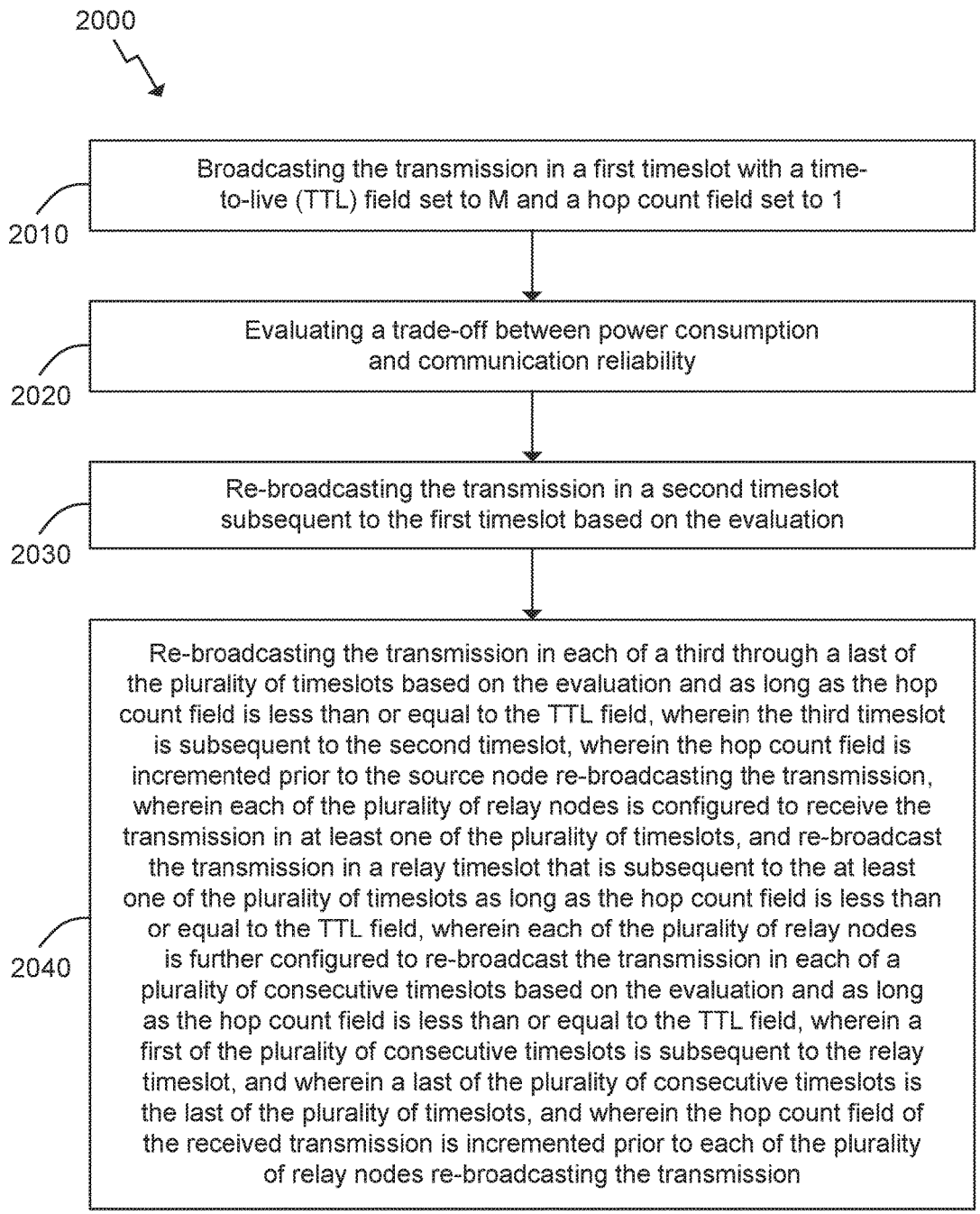
FIG. 20 is a flowchart for a method for the rBMR protocol, according to an embodiment of the present invention.

FIG. 20 is a flowchart for a method based on the recursive broadcast mechanism with re-transmissions (rBMR), according to an embodiment of the present invention. In some embodiments, the order of the steps may be changed. Furthermore, some of the steps in the flowchart may be skipped or additional steps added. This flowchart includes some steps that are similar to those shown in FIGS. 17, 18 and 19, and described above. At least some of these steps may not be separately described in this section.

At step 2030, the source node re-broadcasts the transmission, based on the evaluation, in a second timeslot that is subsequent to the first timeslot and increments the hop count field prior to re-broadcasting the transmission.

At step 2040, the source node re-broadcasts the transmission in each of a third through N-th timeslot based on the evaluation, and increments the hop count field prior to each re-broadcast. Furthermore, each of the relay nodes receive the transmission in a receive timeslot, and re-broadcast the transmission in each subsequent timeslot based on the evaluation. That is, a maximal amount of redundancy is used to ensure a greater level of communication reliability, but at the expense of significant power consumption since every node in the wireless network continues to re-broadcast the transmission in every available timeslot.

Figure 21:
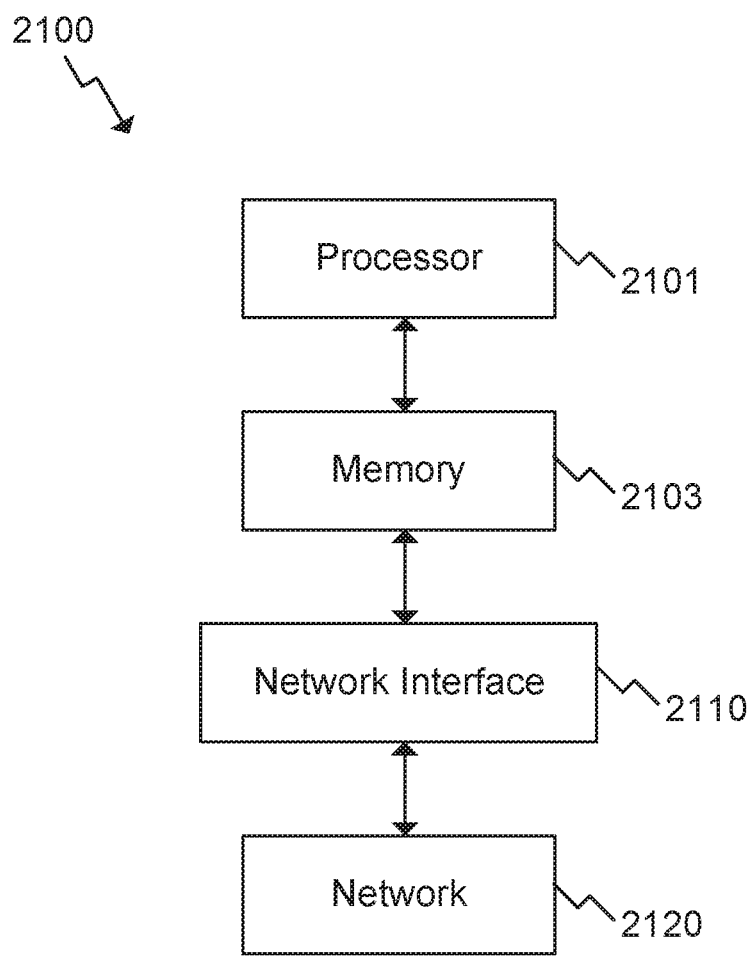
FIG. 21 is a block diagram of a device implemented as a node for reliable broadcasting using re-transmissions, according to an embodiment of the present invention.

FIG. 21 is a block diagram of a device implemented as a node for reliable broadcasting using re-transmissions in time-slotted wireless networks, according to an embodiment of the present invention. This device is provided as an example and is not intended to be limiting. Devices having other configurations may also be used. A shown in FIG. 21, the system comprises a processor 2101, a memory 2103, a network interface 2110, and a network 2120.

The processor 2101 shown in FIG. 21 may comprise component digital processors and may be configured to execute computer-executable program instructions stored in memory 2103. For example, the component digital processors may execute one or more computer programs in accordance with embodiments of the present invention.

Processor 2101 may comprise a variety of implementations for the local re-use of spectrum, broadcasting or re-broadcasting a transmission, and evaluating a trade-off between power consumption and communication reliability, as well as a microprocessor, a digital signal processor (DSP), an application-specific integrated circuit (ASIC), one or more field programmable gate arrays (FPGAs), state machines, or the like. Processor 2101 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 2103 may comprise a non-transitory computer-readable medium that stores instructions which, when executed by the processor 2101, cause the processor 2101 to perform various steps, such as those described herein. Examples of computer-readable media include, but are not limited to, electronic, optical, magnetic, or other storage or transmission devices capable of providing the processor 2101 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 2101 and the processing described may be in one or more structures, or may be dispersed throughout one or more structures.

Processor 2101 is in communication with the network interface 2110 via the memory 2103. The network interface 2110 may comprise one or more network connections. Network interface 2110 connects the processor 2101 and the memory 2101 to a network 2120. The network 2120 may be one of many types of networks known in the art. For example, network 2120 may comprise a wired or wireless network, an ad hoc network, a mesh network, and in an embodiment, may either be a BRN or a frequency-hopped BRN.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed:

1. A method for local re-use in a wireless network, the wireless network being a time-slotted multi-hop wireless network, the wireless network comprising a first source node and being configured to use a spatial pipelining factor (SPF), the method comprising:

transmitting from the first source node, in an $N^{th}$ timeslot, a first data signal over a first frequency allocation, wherein a first subset of a first plurality of nodes is configured to receive the first data signal, and wherein each of the first plurality of nodes belongs to the wireless network and (i) is one hop away from the first source node and (ii) is aligned with timeslots of the wireless network such that the first data signal is received;

transmitting from the first source node, in an $(N+1)^{th}$ timeslot, a first local information signal over a second frequency allocation, wherein at least one of a second plurality of nodes is configured to receive the first local information signal, and wherein each of the second plurality of nodes does not belong to the wireless network and (i) is one hop away from the first source node and (ii) has not been allowed to align with the timeslots of the wireless network such that one or more data signals from the first source node cannot be received; and transmitting from the first source node, in an $(N+2)^{th}$ timeslot, a second local information signal over a third frequency allocation, wherein a second subset of the first plurality of nodes is configured to receive the second local information signal, and wherein a second data signal is transmitted in an $(N+SPF)^{th}$ timeslot over a fourth frequency allocation.

2. The method of claim 1, wherein the wireless network is selected from the group consisting of a barrage relay network (BRN), a frequency-hopped BRN, a mesh network, and a multi-hop ad hoc network.

3. The method of claim 1, wherein the first local information signal is a late net entry message, and wherein the second local information signal is a round trip timing (RTT) request message that is transmitted in a first portion of the $(N+2)^{th}$ timeslot.

4. The method of claim 3, further comprising:
receiving at the first source node, in a second portion of the $(N+2)^{th}$ timeslot, a response to the RTT request message.

5. The method of claim 3, wherein the late net entry message comprises information regarding the wireless network and timing information.

6. The method of claim 1, wherein the first frequency allocation is identical to the fourth frequency allocation, and wherein the second and third frequency allocations are orthogonal to the first frequency allocation.

7. The method of claim 1, wherein the second data signal transmitted in the $(N+SPF)^{th}$ timeslot over the fourth frequency allocation is transmitted by the first source node.

8. The method of claim 1, wherein the second data signal transmitted in the $(N+SPF)^{th}$ timeslot over the fourth frequency allocation is transmitted by a second source node.

9. A method for local re-use in a wireless network, the wireless network being a time-slotted multi-hop wireless network, the wireless network comprising a source node, a plurality of relay nodes and a plurality of out-of-network nodes, each of the plurality of out-of-network nodes being one hop away from the source node, the wireless network being configured to use a spatial pipelining factor (SPF), the method comprising:
transmitting from the source node, in an $N^{th}$ timeslot, a first data signal over a first frequency allocation, wherein a first subset of nodes is configured to receive the first data signal, and wherein each of the first subset of nodes is one of the plurality of relay nodes and is one hop away from the source node;
transmitting, in an $M^{th}$ timeslot, a local information signal over a second frequency allocation, wherein M is greater than N, wherein M is less than (N+SPF), and wherein at least one of a second subset of nodes is configured to receive the local information signal; and
transmitting, in an $(N+SPF)^{th}$ timeslot, a second data signal over a third frequency allocation, wherein at least one of the first subset of nodes is configured to receive the second data signal, and wherein one of the plurality of relay nodes is configured to retransmit retransmitting the first data signal over the third frequency allocation,
wherein each of the plurality of relay nodes is aligned with timeslots of the wireless network such that one or more data signals from the source node can be received, and
wherein each of the plurality of out-of-network nodes has not been allowed to align with the timeslots of the wireless network such that the one or more data signals from the source node cannot be received.

10. The method of claim 9, wherein the wireless network is selected from the group consisting of a barrage relay network (BRN), a frequency-hopped BRN, a mesh network, and a multi-hop ad hoc network.

11. The method of claim 10, wherein the local information signal is a late net entry message, and wherein the second subset of nodes comprises the plurality of out-of-network nodes.

12. The method of claim 10, wherein the local information signal is transmitted in a first portion of the $M^{th}$ timeslot, wherein the local information signal is a round trip timing (RTT) request message, and wherein the second subset of nodes comprises the first subset of nodes.

13. The method of claim 12, further comprising:
receiving at the source node, in a second portion of the $M^{th}$ timeslot, a RTT response message.

14. A system for local re-use in a wireless network, the wireless network being a time-slotted multi-hop wireless network, the wireless network being configured to use a spatial pipelining factor (SPF), the system comprising:
at least one source node;
a plurality of relay nodes; and
a plurality of out-of-network nodes, wherein each of the plurality of out-of-network nodes is one hop away from a first of the at least one source node,
wherein in an $N^{th}$ timeslot:
the first of the at least one source node is configured to transmit a first data signal over a first frequency allocation; and
at least one of a first subset of nodes is configured to receive the first data signal, wherein each of the first subset of nodes is one of the plurality of relay nodes and is one hop away from the first of the at least one source node,
wherein in an $(N+1)^{th}$ timeslot:
the at least one of a first subset of nodes is configured to transmit the first data signal over a second frequency allocation; and
at least one of a second subset of nodes is configured to receive the first data signal, wherein each of the second subset of nodes is one of the plurality of relay nodes and is two hops away from the first of the at least one source node,
wherein in an $M^{th}$ timeslot:
the first of the at least one source node is configured to transmit a local information signal over a third frequency allocation, wherein M is greater than N, and wherein M is less than (N+SPF); and
at least one of a third subset of nodes is configured to receive the local information signal,
wherein in an $(N+SPF)^{th}$ timeslot:
a second of the at least one source node is configured to transmit a second data signal over a fourth frequency allocation; and
one or more of the first subset of nodes is configured to receive the second data signal,
wherein one of the plurality of relay nodes is configured to retransmit the first data signal over the fourth frequency allocation,
wherein each of the plurality of relay nodes is aligned with timeslots of the wireless network such that one or more data signals from the source node can be received, and
wherein each of the plurality of out-of-network nodes has not been allowed to align with the timeslots of the wireless network such that the one or more data signals from the source node cannot be received.

15. The system of claim 14, wherein the wireless network is selected from the group consisting of a barrage relay network (BRN), a frequency-hopped BRN, a mesh network, and a multi-hop ad hoc network.

16. The system of claim 14, wherein the local information signal is a late net entry message, and wherein the third subset of nodes comprises the plurality of out-of-network nodes.

17. The system of claim 14, wherein the local information signal is transmitted in a first portion of the $M^{th}$ timeslot, wherein the local information signal is a round trip timing (RTT) request message, and wherein the third subset of nodes comprises the first subset of nodes.

18. The system of claim 17, wherein at least one of the third subset of nodes is configured to transmit a RTT response message in a second portion of the $M^{th}$ timeslot.

* * * * *